United States Patent
Tseitlin et al.

(10) Patent No.: US 9,225,621 B2
(45) Date of Patent: Dec. 29, 2015

(54) PROGRESSIVE DEPLOYMENT AND TERMINATION OF CANARY INSTANCES FOR SOFTWARE ANALYSIS

(71) Applicant: NETFLIX, INC., Los Gatos, CA (US)

(72) Inventors: Ariel Tseitlin, Sunnyvale, CA (US); Joe Sondow, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 366 days.

(21) Appl. No.: 13/926,797

(22) Filed: Jun. 25, 2013

(65) Prior Publication Data

US 2014/0379901 A1 Dec. 25, 2014

(51) Int. Cl.
*G06F 15/173* (2006.01)
*H04L 12/26* (2006.01)
*H04L 12/24* (2006.01)
*H04L 29/08* (2006.01)
*G06F 11/36* (2006.01)

(52) U.S. Cl.
CPC ............ *H04L 43/08* (2013.01); *H04L 41/0896* (2013.01); *H04L 41/5025* (2013.01); *H04L 41/5096* (2013.01); *G06F 11/368* (2013.01); *H04L 29/0827* (2013.01); *H04L 29/08153* (2013.01)

(58) Field of Classification Search
CPC . H04L 43/08; H04L 41/0896; H04L 41/5025; H04L 41/5096; H04L 29/08153; H04L 29/0827; G06F 11/368
See application file for complete search history.

(56) References Cited

U.S. PATENT DOCUMENTS

| | | | |
|---|---|---|---|
| 2010/0229096 A1* | 9/2010 | Maiocco | G06F 15/173 715/734 |
| 2011/0208808 A1* | 8/2011 | Corbett | G06F 17/30442 709/203 |
| 2012/0017165 A1* | 1/2012 | Gardner | H04L 67/36 715/771 |
| 2012/0060146 A1* | 3/2012 | Maurer | G06F 9/45504 717/110 |
| 2012/0266156 A1 | 10/2012 | Spivak et al. | |
| 2013/0339519 A1* | 12/2013 | Lientz | H04L 41/0896 709/224 |
| 2014/0068053 A1* | 3/2014 | Ravi | G06F 9/5072 709/224 |

OTHER PUBLICATIONS

Sondow, Joe, "Asgard: Web-based Cloud Management and Deployment", dated Jun. 25, 2012, 10 pages.
Sondow, Joe, "Asgard: The Grails App that Deploys Netflix to the Cloud", GRConf Europe 2012, Jun. 6-8, 43 pages.

* cited by examiner

*Primary Examiner* — Krisna Lim
(74) *Attorney, Agent, or Firm* — Hickman Palermo Becker Bingham LLP

(57) ABSTRACT

A data processing method, comprising: using computing apparatus, causing instantiating a plurality of baseline application instances that are running a first version of software, and one or more canary application instances that are running a second version of the software; using computing apparatus including a load balancer, causing selectively routing a first proportion of incoming requests to the baseline instances, and routing a second proportion of the incoming requests to the canary instances; monitoring the plurality of canary instances to collect performance data for performance metrics; determining that the performance data indicates a negative performance issue, and in response thereto: using computing apparatus, automatically updating the first proportion to be larger and updating the second proportion to be smaller, and then reconfiguring the load balancer based upon the first proportion and the second proportion; terminating one or more of the canary application instances.

25 Claims, 14 Drawing Sheets

FIG. 10

PROGRESSIVE DEPLOYMENT AND TERMINATION OF CANARY INSTANCES FOR SOFTWARE ANALYSIS

BACKGROUND

1. Technical Field

The present disclosure generally relates to deployment and termination of different versions of code in application instances in cloud computing systems.

2. Description of Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Rather than relying on a single large software application to provide every facet of a modern software solution, many software solutions today are made up of a substantial number of different services that are designed to work together to provide the functionality of the overall system. For instance, rather than writing a single standalone application that provides an online content streaming service, such a service could be provided by tens or even hundreds of smaller software services, each designed to perform a specific set of tasks, and that work together to provide the content streaming service. Doing so has several pronounced advantages. For instance, it can be easier to compartmentalize the development of the software application, as each standalone service can be assigned to a small group of programmers for implementation. Additionally, doing so greatly improves the modularity of the software solution, allowing individual services to be easily removed and replaced with updated services that perform the same task. As yet another advantage, such a modularized design allows the software solution to be easily distributed and redistributed over multiple different compute nodes (either physical or virtual), based on how the different services are positioned and configured.

However, it can potentially be difficult to pinpoint the root cause of a problem in a heavily distributed software solution. For example, consider a solution made up of several hundred interconnected services. In such an environment, a problem occurring in one of the services may adversely affect the performance and/or quality of several other services, which in turn may adversely affect the performance and/or quality of still other services. When this occurs, the developers and engineers may have difficulty pinpointing which of the many malfunctioning services originally caused the problem. As another example, when a particular service begins consuming a large amount of system resources, it may be difficult to determine whether an update to the particular service is causing the heavy resource usage, or whether an update to another one of the services is causing the heavy resource usage. In this context, "performance" refers to any aspect of a service that indicates the service's health and quality, including metrics such as the rate of errors that a service generates.

Additionally, the vast majority of software applications go through a number of different iterations during their lifespan. For instance, a newer version of a software application could add a new feature to the software application. As another example, the newer version could attempt to resolve a problem with the previous version of the software application. As a practical matter, newer versions of software typically include a multitude of different changes and new features. Furthermore, the newer version of software may frequently be developed by a substantial number of developers, with one or more developers working on each of the changes and new features, and then merging their individual contributions into a single release version of the software.

However, since software development is not a perfect science, the newer version of software may introduce new problems as well. Such problems could be caused by any number of factors, including incompatible code introduced during the merge process, mistakes during the merge process, or simply errors in the code. While these problems could cause the new version of software to fail during execution, in other situations these problems could affect the performance and/or quality of the software application (e.g., resulting in higher memory and CPU usage during execution), and thus may be harder to detect during quality assurance testing. Administrators need to be able to identify functional regressions that actually occur, because simulating performance in test environments is necessarily imperfect. In an environment in which a number of interrelated services are executing and in which the performance and/or quality of a particular service can be influenced not only by the particular service's personal workload, but by the performance and/or quality and workload of other services as well, it can be significantly harder to detect minor differences in the performance and/or quality of a newer version of one of the services.

SUMMARY OF THE INVENTION

The appended claims may serve as a summary of the invention.

BRIEF DESCRIPTION OF THE DRAWINGS

In the drawings:

FIG. 10 illustrates an example screen display that may be generated by an application framework and showing a filtered subset of applications running in a production account at a cloud service provider (CSP) and associated with a particular geographic region.

Figure 1:
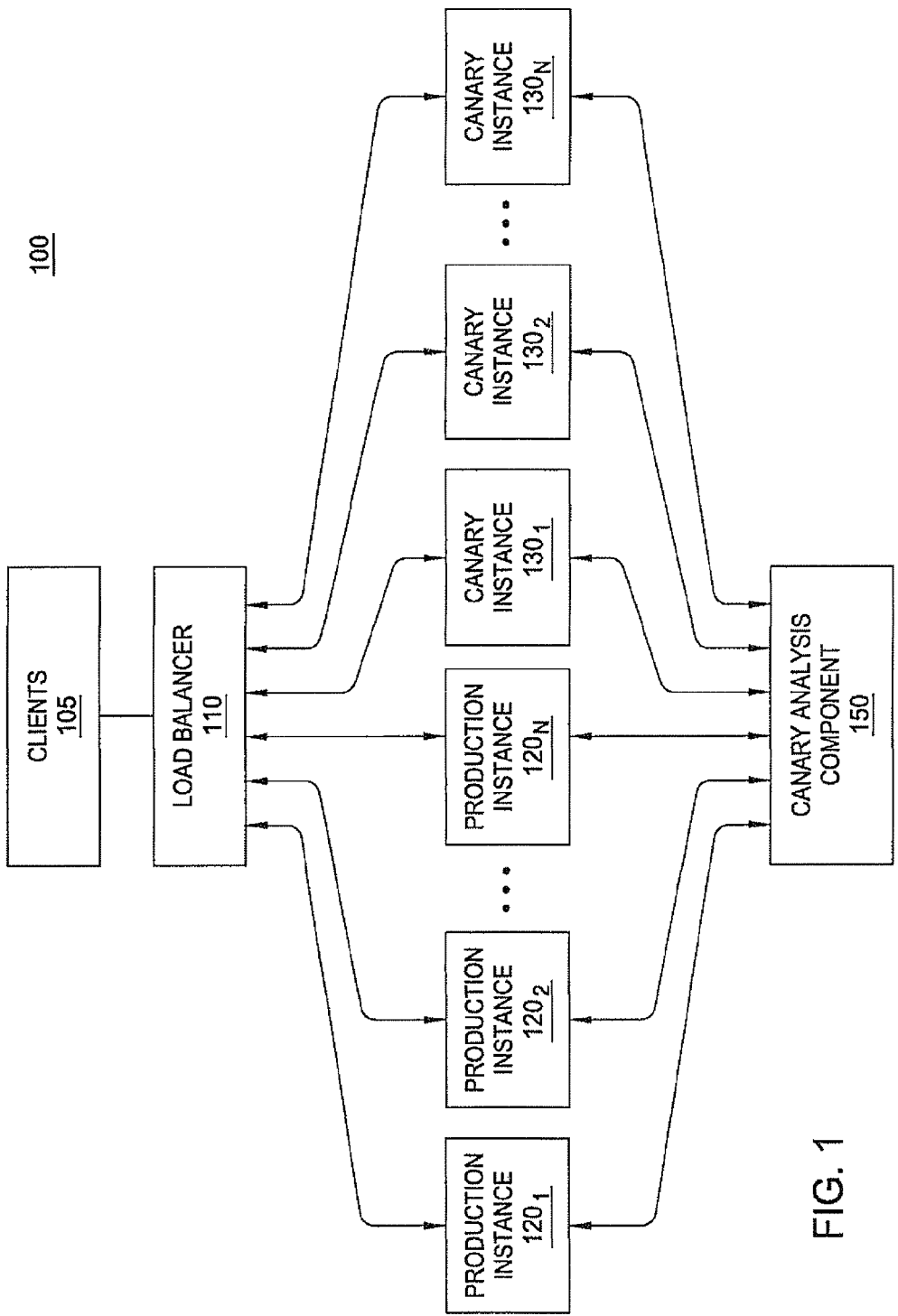
FIG. 1 illustrates a canary analysis environment configured with a canary analysis component, according to one embodiment described herein.

DETAILED DESCRIPTION 1.0 Performance Monitoring in Canary Analysis 1.1 Overview

Embodiments provide a method for evaluating a second version of software. The method includes selectively routing incoming requests to software instances within a plurality of software instances. Here, the plurality of software instances comprises a plurality of baseline instances and a plurality of canary instances. In this context, a "canary instance" typically is an image of an application representing a new version of that application, which may be deployed gradually (and possibly temporarily) into actual production use, for the purpose of study and monitoring to determining whether the new version generates errors when placed in production use; the term "canary" evokes the use of a "canary in a coal mine" as a means of detecting problems in a physical environment, because if the canary instance results in performance or health issues, the canary instance can be removed from the production environment relatively rapidly and replaced with instances of the old version while the issues are evaluated.

Additionally, each of the baseline instances in the plurality of baseline instances runs a first version of the software, and the plurality of canary instances run the second version of the software. The method also includes monitoring the plurality of software instances to collect performance data for a plurality of performance metrics. Additionally, the method includes calculating a plurality of aggregate baseline performance metrics, wherein each of the plurality of aggregate baseline performance metrics corresponds to one of the plurality of performance metrics. Here, each of the plurality of aggregate baseline performance metrics is calculated based on the collected performance data for the plurality of baseline instances, relating to a corresponding one of the plurality of performance metrics. The method further includes, for each of the plurality of performance metrics and for each of the plurality of canary instances, calculating a relative performance value that measures the collected performance data for the respective canary instance and for the respective performance metric, relative to the corresponding aggregate baseline performance metric from the plurality of aggregate baseline performance metrics. Also, the method includes calculating a final overall measure of performance for the second version of software, based on the relative performance values.

Other embodiments include, without limitation, a non-transitory computer-readable medium that includes instructions that enable a processing unit to implement one or more aspects of the disclosed methods as well as a system configured to implement one or more aspects of the disclosed methods.

Although there are numerous advantages to a modularized computing environment, in which a multitude of different services are each designated a specific task or set of tasks, such an environment also introduces several challenges as well.

For example, in a computing environment including hundreds of services, each of which may be dependent upon the performance of one or more other services, it can be challenging to quickly diagnose the source(s) of a problem. As used herein, a particular service can be said to be dependent upon another service, when the particular service's performance can be affected by the performance of the other service. In such an environment, when a single service begins to malfunction, the malfunctioning service can impact the performance of other services (e.g., services which depend upon the single service), which in turn can affect the performance of still other services, and so on. As a result, it can be difficult for an administrator to diagnose the root cause of a problem, when a number of different services begin malfunctioning.

Additionally, the efficiency of a single service's performance can vary depending on a number of different factors in such an environment. For example, a given service could consume more CPU resources and memory resources when its incoming workload increases (e.g., when more requests are routed to the service for processing). As another example, the service could begin consuming more CPU and memory resources, due to the behavior of another one of the services. For instance, a database service's workload could significantly increase, if another service begins erroneously submitting queries to the database service for process. As such, when testing a new version of a particular software service, it can be difficult to ascertain whether any variation in the new version's performance efficiency, relative to the previous version of the service, are in fact caused by the new version of the code (i.e., as opposed to the behavior of another service(s) or a fluctuation in the incoming workload of the service.

As such, embodiments provide techniques for evaluating a version of software. Embodiments may selectively route incoming requests to software instances within a plurality of software instances, where the plurality of software instances includes a baseline instances and canary instances. For purposes of this example, assume that the baseline instances are running a baseline version of the software and the canary instances are running the version of the software to be evaluated (that is distinct from the baseline version of the software). For instance, the baseline version could be the current version of the code that is used in a production environment, and the version to be evaluated could be a new version of the code that is scheduled for deployment in the production environment. More generally, however, it is broadly contemplated that any two instances of software that perform the same function may be compared using the techniques described herein.

Moreover, embodiments may be configured to route incoming requests to the software instances in a number of different ways. Generally, it is preferable that the incoming requests (and the workload from processing these requests) be evenly distributed across each of the plurality of software instances. In some embodiments, where each of the software instances has equal processing power and where each request requires approximately the same amount of processing power, a simple load balancing technique (e.g., round robin load balancing) may be employed. However, in other embodiments, particular requests may require significantly more (or less) processing, relative to other requests, and/or particular software instances may have significantly more (or less) processing power (e.g., due to the hardware on which the software instances are executing). As such, it is broadly contemplated that routing the incoming requests, embodiments may employ any number of different load balancing techniques in routing the incoming requests to the software instances. Examples of such techniques include, without limitation, round robin load balancing, weighted round robin load balancing, dynamic round robin load balancing, fastest load balancing, least connections load balancing, observed load balancing, and predictive load balancing. More generally, however, any technique (known or unknown) for distributing the workload associated with processing the incoming requests across the plurality of software instances may be used, in accordance with the functionality described herein.

Additionally, embodiments may monitor the plurality of software instances to collect performance data for a plurality of performance metrics. For instance, a respective monitoring agent could be deployed for each of the plurality of software instances. The monitoring agents could collect performance data for the respective software instance and could report this performance data to a canary analysis component. Examples of the performance metrics include, without limitation, CPU usage, memory usage, network usage, latency, transaction rate, error rate, and so on. More generally, the performance metrics may include any measure of any sort of performance that is related to at least one of the software instances.

Embodiments may then calculate a plurality of aggregate baseline performance metrics, where each of the plurality of aggregate baseline performance metrics corresponds to one of the plurality of performance metrics, and where each of the plurality of aggregate baseline performance metrics is calculated based on collected performance data for the plurality of baseline instances, relating to a corresponding one of the plurality of performance metrics. As an example, embodiments could calculate an aggregate measure of CPU usage across all of the baseline instances by calculating an average of the CPU usage metrics collected for the baseline instances, and could calculate a similar aggregate measure for each of the other performance metrics measured.

Additionally, for each of the plurality of performance metrics and for each of the plurality of canary instances, embodiments may calculate a relative performance value that measures the collected performance data for the respective canary instance and for the respective performance metric, relative to the corresponding aggregate baseline performance metric from the plurality of aggregate baseline performance metrics. For instance, embodiments could compare the CPU usage metric for one of the canary instances against the aggregate CPU usage metric calculated for the plurality of baseline instances, and could calculate a relative performance value for the canary instance using these values. For instance, embodiments could divide the canary's average CPU usage metric by the baseline instances' aggregate average CPU usage metric, to produce a canary-to-baseline ratio with respect to the average CPU usage metric. Embodiments could also compute an expected lower bound and upper bound of the canary-to-baseline ratio, based on the measured statistics of the baseline aggregate average CPU usage metric and the canary instance average CPU usage metric.

Embodiments may then calculate a final measure of performance for the version of software being evaluated (i.e., the version of software running on the canary instances), based on the relative performance values. For instance, embodiments could calculate an aggregate relative performance value for each of the plurality of performance metrics. As an example, embodiments could calculate each of the aggregate relative performance values by calculating an average of the relative performance values for the respective performance metric. Embodiments could then calculate the final measure of performance, based on the aggregate relative performance values (e.g., by calculating an average of the aggregate relative performance values). Advantageously, doing so provides a relative comparison of the evaluated version of software to the baseline version of software. For example, embodiments could measure an average variance across all the performance metrics for the evaluated version of software, relative to the metrics for the baseline version, and could calculate a single number expressing a measure of confidence that the canary instances are healthy (e.g., a confidence measure of 85%), which can then be compared to a threshold measure of confidence to determine an overall acceptability for the canary software build.

Moreover, in particular embodiments, the final measure of performance can be calculated in various ways, in order to evaluate different performance aspects of the software versions. For example, a weighted average could be used in which particular performance metrics are given more (or less) weight. In one embodiment, certain metrics may be inverted when the final measure of performance is calculated. For example, a higher measured value for a particular performance metric, relative to a lower measured value for the particular performance metric, may be indicative of more efficient performance by the software (e.g., a metric such as incoming requests processed per second). At the same time, a higher measured value for another performance metric may be indicative of less efficient performance by the software (e.g., CPU usage, memory usage, etc.). As such, in one embodiment, the final measure of performance is calculated where a higher final measure of performance is indicative of more efficiently executing software, and in such an embodiment, measured values certain performance metrics could be inverted (e.g., metrics where a lower measured value is indicative of more efficient performance) in calculating the final measure of performance.

1.2 Canary Analysis Environment

FIG. 1 illustrates a canary analysis environment configured with a canary analysis component, according to one embodiment described herein. As shown, the system 100 includes a plurality of clients 105, a load balancer component 110, a plurality of production instances 120₁₋N, a plurality of canary instances 130₁₋N, and a canary analysis component 150. For purposes of this example, assume that the production instances 120₁₋N are running a baseline version (e.g., a production version) of a software application and the canary instances 130₁₋N are running a new version of the software application. Generally, the clients 105 may submit requests for processing, and the load balancer 110 could distribute the incoming requests between the software instances 120₁₋N and 130₁₋N for processing. For instance, load balancer component 110 could selectively route incoming requests to software instances 120₁₋N and 130₁₋N, according to a particular load balancing algorithm. Additionally, to minimize any potential disruption to the plurality of clients 105, the number of production instances 120₁₋N may be much larger than the number of canary instances 130₁₋N. In such an environment, a majority of client requests could be routed to the production instances 120₁₋N, thereby insuring that any disruption caused by the canary instances 130₁₋N affects only a minority of the client requests. In one embodiment, the system 100 represents an online content streaming service, in which a plurality of client devices 105 submit requests for streaming video content and these requests are fulfilled (at least in part) by the software instances 120₁₋N and 130₁₋N. More generally, however, it is contemplated that the canary analysis component 150 may be configured for use in any type of environment, consistent with the functionality described herein.

In one embodiment, if the load balancer component 110 submits a request to one of the instances 1201-N and 1301-N and the request is not processed within a predetermined amount of time, the load balancer component 110 could be configured to resubmit the request to a different one of the instances 1201-N and 1301-N. Advantageously, doing so allows for instances running the new version of the software application to be deployed within a production environment, while minimizing any impact on the clients 105. That is, if one of the canary instances 1301-N running the new version of software experiences a problem in processing a request (e.g., due to a bug in the new version of software) which prevents the request from being processed within the predetermined amount of time, the load balancer 110 could resubmit the request to one of the production instances 1201-N for processing.

Additionally, the canary analysis component 150 could monitor the software instances 1201-N and 1301-N to collect performance data relating to a plurality of performance metrics. For instance, a respective monitoring component(s) (not shown) could be deployed for each of the instances 1201-N and 1301-N, and these monitoring components could collect performance data for their respective software instance and transmit the collected performance data to the canary analysis component 150 (e.g., via a communications network). The canary analysis component 150 could then calculate aggregate baseline performance metrics based on the production instances 1201-N, where each of the aggregate baseline performance metrics is calculated based on performance data collected from the plurality of production instances 1201-N, for a given one of the performance metrics. As an example, the canary analysis component 150 could calculate average value across the production instances 1201-N, for each of the performance metrics being measured.

Additionally, for each of the performance metrics and canary instances, the canary analysis component 150 could calculate a relative performance value that measures the collected performance data for the respective canary instance and for the respective performance metric, relative to the corresponding aggregate baseline performance metric. For example, the canary analysis component 150 could calculate a particular canary instance's relative performance value for an average CPU usage metric, by calculating the ratio between the particular canary instance's average CPU usage metric and the aggregate baseline performance metric for average CPU usage.

The canary analysis component 150 could then calculate a similar relative performance value for the canary instance, for each of the other performance metrics, and could then calculate similar relative performance values for the other canary instances.

The canary analysis component 150 could then calculate a final measure of performance for the version of software being evaluated (that is, the version of software running on the canary instances), based on the relative performance values. For instance, the canary analysis component 150 could calculate an aggregate relative canary performance value for each of the plurality of performance metrics being measured, based on the relative performance values for the canary instances 1301-N. For instance, to determine the aggregate relative canary performance value for a given one of the performance metrics, the canary analysis component 150 could calculate an average of the relative performance values relating to the given performance metric. The canary analysis component 150 could then determine the final measure of performance for the version of software being evaluated, based on the aggregate relative canary performance values. For instance, the canary analysis component 150 could determine the final performance measure by calculating an average of the aggregate relative canary performance values. Advantageously, doing so provides a measure of the variability between the performance metrics for the version of software running on the canary instances 1301-N, relative to the performance metrics for the baseline version of software running on the production instance 1201-N. Such a value could then be used to determine whether the new version of the software has affected the software's performance.

Figure 2:
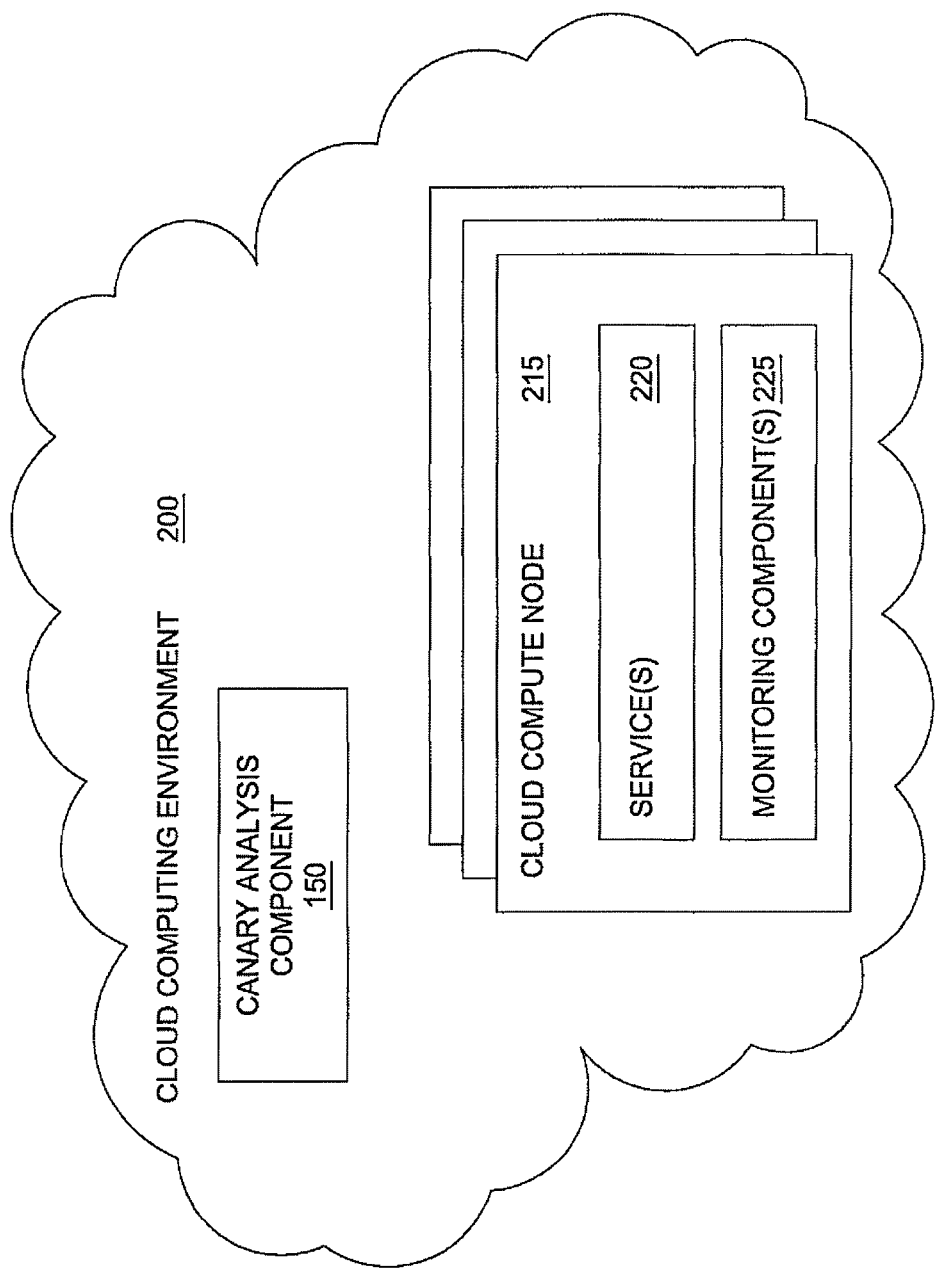
FIG. 2 illustrates a cloud computing environment configured with a canary analysis component, according to one embodiment described herein.

In one embodiment, the canary analysis component 150 is configured to operate within a cloud computing environment; characteristics of an example cloud computing environment are described herein in other sections. FIG. 2 illustrates a cloud computing environment configured with a canary analysis component, according to one embodiment described herein. As shown, the cloud computing environment 200 includes the canary analysis component 150 and a plurality of cloud compute nodes 215. The cloud compute nodes 215 each contain a respective one or more services 220 and a respective one or more monitoring components 225. Generally, each of the monitoring components 225 can be configured to monitor a corresponding one of the service 220 in order to collect performance data pertaining to a plurality of performance metrics for a corresponding one of the services 220. In one embodiment, the monitoring components 225 are configured to transmit the collected performance data to the canary analysis component 150 (e.g., via a local area network within the cloud computing environment 200). In a particular embodiment, the monitoring components 225 are configured to store the collected performance data (e.g., in a database), and the canary analysis component 150 is configured to retrieve the stored performance data (e.g., by querying the database).

The canary analysis component 150 may also be configured to filter out certain performance data when calculating a final measure of performance for a version of software. For example, if one of the monitoring components 225 reports performance data to the canary analysis component 150 that has an excessively high variance (e.g., a measure of variance that exceeds a predefined threshold level of variance), the canary analysis component 150 could label this data as noisy and could exclude it from consideration in calculating the final measure of performance. As another example, if one of the monitoring components 225 reports an error message to the canary analysis component 150 in lieu of or in addition to the performance data, the canary analysis component 150 could be configured to exclude the performance data from consideration in calculating the final measure of performance. As yet another example, if one of the monitoring components does not report a sufficient amount of data to the canary analysis component 150 (e.g., when the number of reported data points failed to exceed a predefined minimum number of data points), the canary analysis component 150 could exclude this data from consideration. More generally, it is broadly contemplated that the canary analysis component 150 may exclude any performance data that is determined to be questionable and/or insufficient for consideration in calculating the final measure of performance for a particular version of software. In one embodiment, the canary analysis component 150 is configured to impose requirements that a certain number of performance metrics be valid, before calculating the final measure of performance for the canary instances.

1.3 Collecting and Analyzing Performance Data

Figure 3:
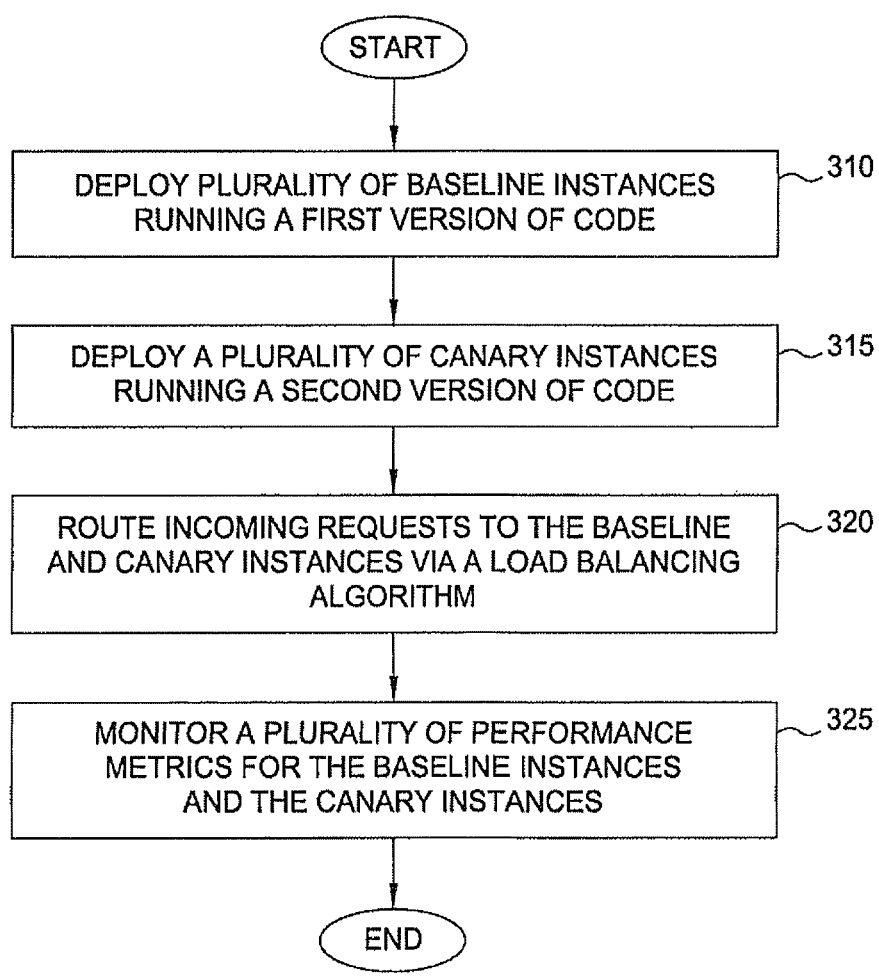
FIG. 3 is a flow diagram illustrating a method for collecting performance data in a canary analysis environment, according to one embodiment described herein.

FIG. 3 is a flow diagram illustrating a method for collecting performance data in a canary analysis environment, according to one embodiment described herein. As shown, the method 300 begins at block 310, where baseline instances running a first version of code are deployed. Canary instances running a second version of code are also deployed (block 315). For instance, the baseline instances and canary instances could be deployed by a user (e.g., an engineer or developer). In one embodiment, the canary analysis component 150 is configured to automatically deploy the canary and baseline instances for testing.

Additionally, a load balancer component is configured to selectively route incoming requests to the baseline and canary instances, via a load balancing algorithm (block 320). As discussed above, any algorithm for balancing incoming traffic between the deployed software instances may be used, in accordance with the functionality described herein. Examples of such load balancing algorithms include, without limitation, round robin load balancing, weighted round robin load balancing, dynamic round robin load balancing, and so on. Advantageously, by distributing incoming traffic and the accompanying workload as evenly as possible between the baseline and canary instances, embodiments help to ensure an accurate comparison between the first version of software running on the baseline instances and the second version of software running on the canary instances. In one embodiment, the canary analysis component 150 is configured to direct more traffic toward the canary instance, and less traffic towards the baseline instances, in order to evaluate how the canary instances perform under extra load. Such a test may be referred to as a "squeeze test." In such a squeeze test, the canary analysis component 150 can monitor the plurality of performance metrics for the canary instances, in order to verify that the overall health and performance of the canary instances does not degrade unexpectedly with increasing load.

The canary analysis component 150 also monitors a plurality of performance metrics across the plurality of baseline instances and the plurality of canary instances (block 325), and the method 300 ends. Generally, the performance metrics may be any quantifiable measure relating to the performance of a software application, or any aspect of a service that indicates the service's health and quality, including metrics such as the rate of errors that a service generates.

Examples include, without limitation, measures of CPU usage, memory usage, latency, and so on. As discussed above, in one embodiment, a respective monitoring component is provisioned for each of the plurality of canary instances and for each of the plurality of baseline instances. These monitoring components could be configured to collect data relating to the performance metrics being measured and to report this data to the canary analysis component 150.

Figure 4:
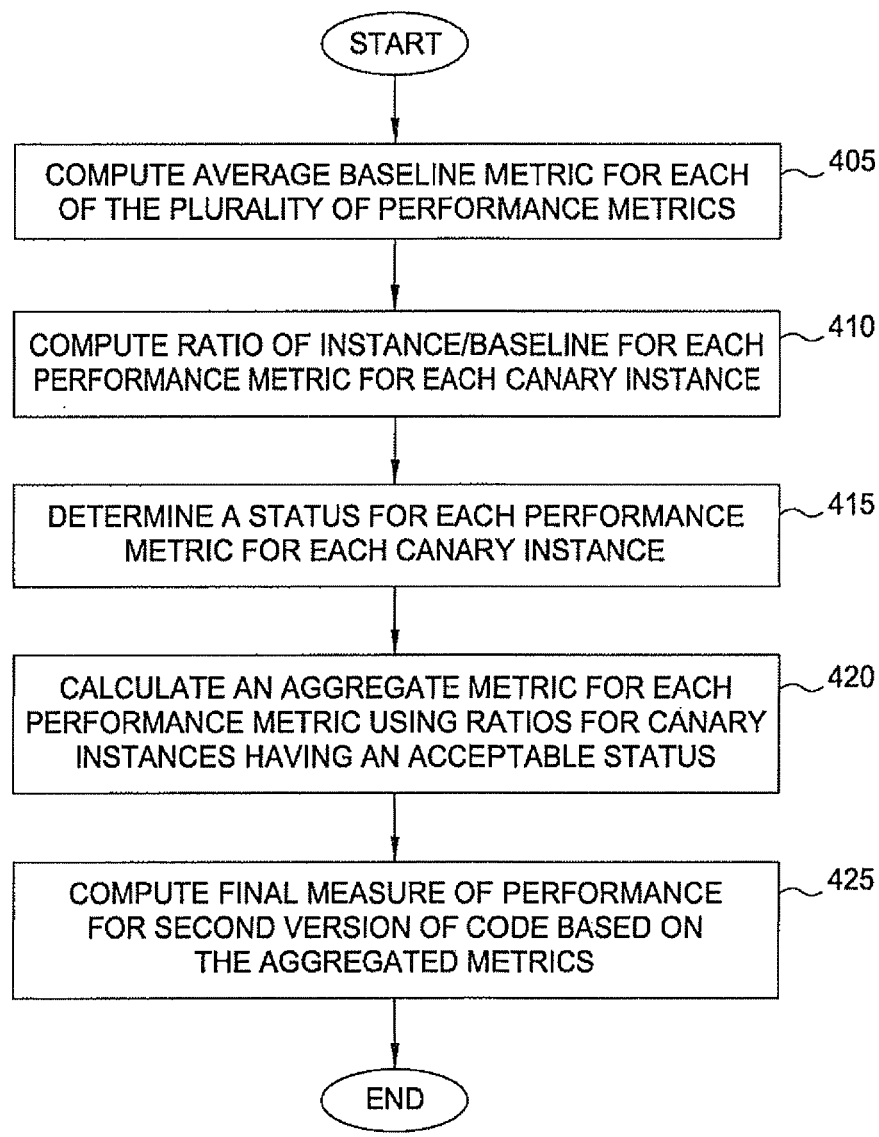
FIG. 4 is a flow diagram illustrating a method for computing canary analysis results, according to one embodiment described herein.

FIG. 4 is a flow diagram illustrating a method for computing canary analysis results, according to one embodiment described herein. As shown, the method 400 begins at block 405, where the canary analysis component 150 computes an average baseline metric for each of the plurality of performance metrics. For example, for a CPU usage metric, the canary analysis component 150 could calculate the average of the CPU metrics measured across all of the baseline instances. The canary analysis component 150 could then calculate a similar average baseline metric for each of the other performance metrics being measured (e.g., memory usage, latency, etc.).

Once the average baseline metrics are calculated, the canary analysis component 150 calculates, for each of the plurality of canary instances and for each of the performance metrics being measured, a measure of variance between the measured metric for the respective canary instance and the corresponding average baseline metric. In the depicted method 400, the canary analysis component 150 calculates the ratio of the measured metric for the respective canary instance to the corresponding average baseline metric. For example, if the canary analysis component 150 determines that the CPU usage metric for the respective canary instance is 40% and the average baseline CPU usage metric is 45%, the canary analysis component 150 could determine that the ratio is 0.89 (i.e., 0.40|0.45). Of course, the determination of such a ratio is but one example of the measure of variance, and it is broadly contemplated that any measure of variance between the measured performance metric for the respective canary instance and the corresponding average baseline metric may be used.

Additionally, in the depicted example, the canary analysis component 150 determines a status for each of the measured metrics for each of the canary instances (block 415). For example, if the variance of a portion of the performance data measured for a given performance metric and a given canary instance exceeds a predetermined threshold level of variance, the canary analysis component 150 could determine that the portion of performance data is excessively noisy and should be excluded from consideration in computing the final measure of performance. As another example, the canary analysis component 150 could determine that an insufficient amount of performance data had been collected for a particular one of the canary instances with respect to a particular one of the measured performance metrics, and accordingly could determine that this performance data should also be excluded from consideration.

The canary analysis component 150 then calculates an aggregate metric for each of the measured performance metrics, using the calculated measures of variance between the data collected for the canary instances and the aggregate baseline metrics (block 420). For instance, in block 410, the canary analysis component 150 could have calculated a measure of variance in the CPU usage metric for each of the canary instances. In calculating the aggregate metric for CPU usage, the canary analysis component 150 could calculate the average of the measures of variance in the CPU usage metric across the canary instances having an acceptable status (e.g., excluding metrics having a noisy, insufficient or error status).

The canary analysis component 150 then calculates a final measure of performance for the version of software running on the canary instances, based on the aggregated metrics (block 425). In one embodiment, the canary analysis component 150 is configured to calculate the final measure of performance by computing an average of the aggregate metric values across all of the measured performance metrics. In a particular embodiment, the canary analysis component 150 computes the final measure of performance using a weighted average, where the aggregate metric relating to a certain one of the performance metrics is given a greater weight than the aggregate metric for another one of the performance metrics. More generally, any algorithm or technique for calculated the final measure of performance based on the aggregated metric values can be used, in accordance with the functionality described herein. Once the final measure of performance is calculated, the method 400 ends.

Figure 5:
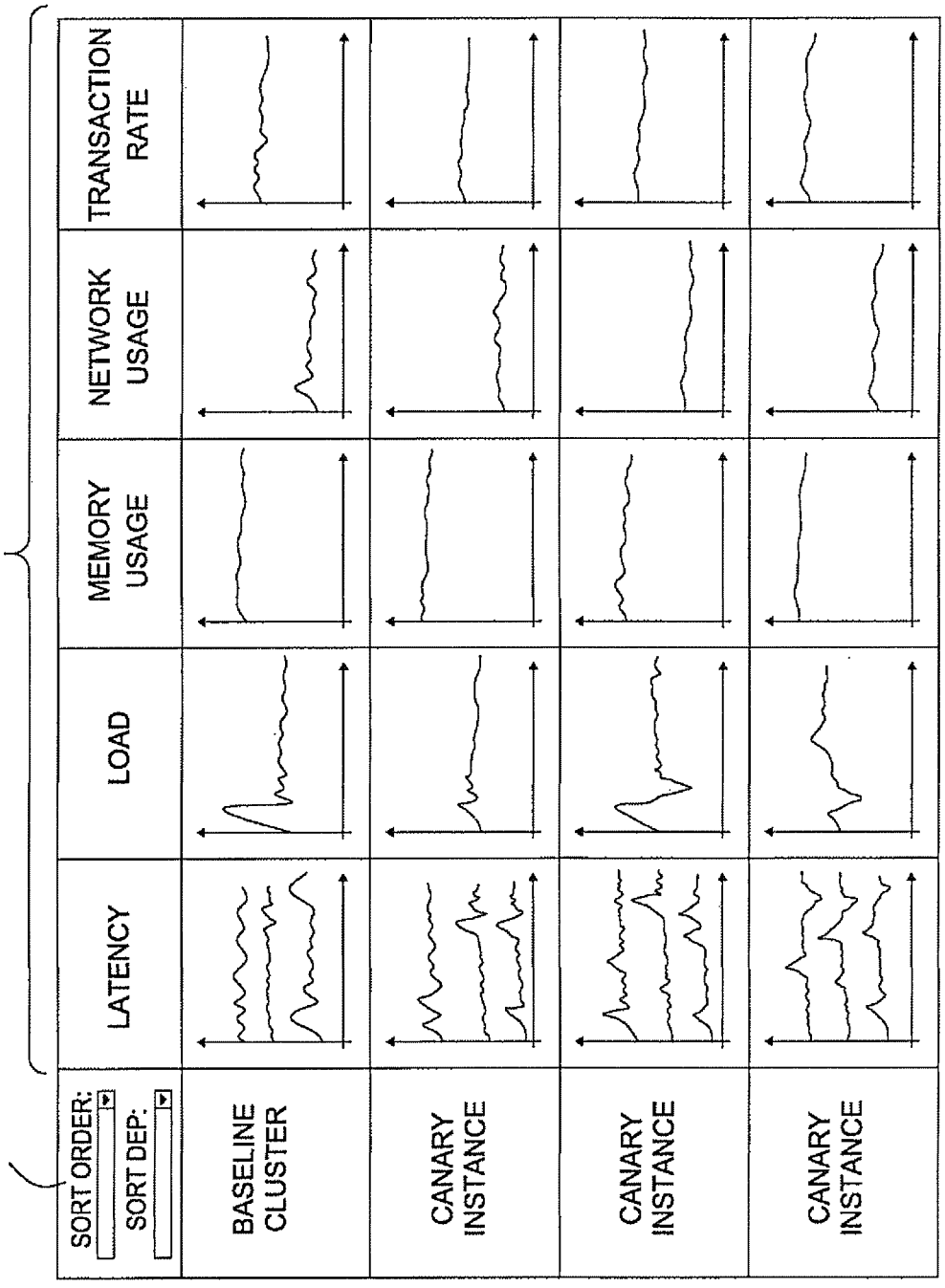
FIG. 5 illustrates an interface for displaying performance data relating to a canary analysis, according to one embodiment described herein.

FIG. 5 illustrates an interface for displaying performance data relating to a canary analysis, according to one embodiment described herein. As shown, the interface 500 includes a plurality of performance metrics 510, a plurality of rows 520 and sorting buttons 505. Generally, the sorting buttons 505 can be used to alter the order in which the rows 520 are presented in the interface 500. As shown, the performance metrics being measured in the depicted embodiment include measures of latency, load, memory usage, network usage and transaction rate. While only a relatively small number of performance metrics are shown in the interface 500, the value of automated canary analysis becomes even more apparent when hundreds of performance metrics are monitored and evaluated across a substantial number of software instances. Of note, the depicted embodiment includes multiple different measures of latency for each of the rows, which are displayed within a single graph. Examples of different measures of latency include, for example, measures of latency to distinct sub-parts within a software instance and different types of types of measures of latency (e.g., roundtrip latency, endpoint computational speed, traceroutes, etc.).

Each of the rows 520 represents a respective one or more software instances. In one embodiment, the rows 520 may represent aggregate performance metrics for clusters of instances. For example, in the depicted embodiment, the baseline software instances are represented using a single row, and the data depicted for the various metrics 510 in this row relates to the baseline instances as a whole. For example, the performance metrics 510 for the baseline cluster row could depict the average measured value across all of the baseline instances. The rows 520 also include several canary instances. While a single canary instance is shown per row in the depicted embodiment, it is contemplated that embodiments could group the canary instances into one or more clusters, and these clusters could be depicted on the rows 520 of the interface 500. Advantageously, by depicting the collected data in graphical form using the interface 500, embodiments can quickly and efficiently communicate the performance of the canary instances and the baseline instances to users.

Figure 6:
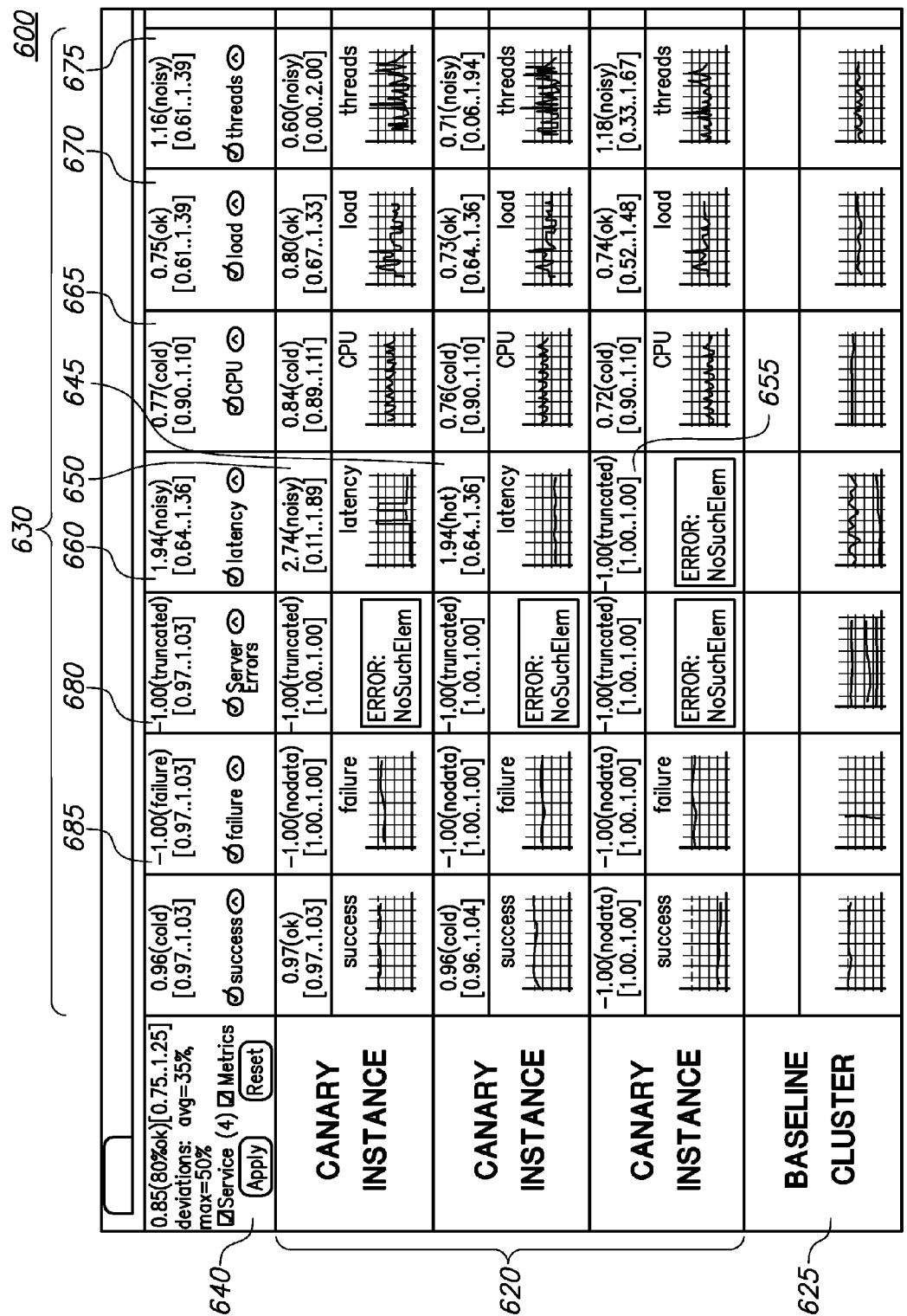
FIG. 6 illustrates an interface for displaying canary analysis results, including the handling of metric gathering errors occurring during analysis, according to one embodiment described herein.

FIG. 6 illustrates an interface for displaying canary analysis results, according to one embodiment described herein. As shown, the interface 600 includes a plurality of rows 620, each relating to a different canary software instance (or group of canary instances), and a plurality of columns 630, each relating to a different performance metric measured for the plurality of canary instances. Generally, the interface 600 is used to display not only the visual depictions of the performance data collected for the various canary instances, but also to display the results of the analysis of the version of software deployed on the canary instances.

For example, in the depicted example, the canary analysis component 150 has classified each of the measured performance metrics for each of the canary instances based on various quality criteria. In the depicted embodiment, these classifications include an "ok" classification (i.e., for an average metric value within an acceptable range, relative to the corresponding metric value for the cluster of baseline instances), a "cold" classification (i.e., for an average metric value that is significantly less than the corresponding metric value measured for the cluster of baseline instances), a "hot" classification (i.e., for an average metric value that is significantly greater than the corresponding metric value measured for the cluster of baseline instances), a "noisy" classification (i.e., for a metric with a significant amount of variance), a "nodata" classification (i.e., for a metric where no data was collected), and a "truncated" classification (i.e., for a metric where less data than would be expected was collected, e.g., when an instance has only been running for 10 minutes, while the time collection window is 1 hour). More generally, however, it is broadly contemplated that these classifications, a subset of these classifications, and numerous other classifications can be used, consistent with the functionality described herein.

For instance, as shown, canary analysis component 150 has assigned the latency metric 650 for the first canary instances a noisy classification due to an excessive amount of variance. That is, the canary analysis component 150 has calculated an expected range from 0.11 to 1.89 for this metric, and has determined that this amount of variance is significant enough to classify the metric as "noisy" (e.g., based on a determination that the amount of variance exceeds a predetermined threshold measure of variance).

Additionally, the canary analysis component 150 has calculated a relative value of 2.74 for the latency metric 650 for one specific canary instance. In one embodiment, the canary analysis component 150 is configured to calculate this value by dividing the average metric for the canary instance by the corresponding metric collected for the cluster of baseline instances. In another embodiment, the canary analysis component 150 is configured to calculate this value by dividing the corresponding metric collected for the cluster of baseline instances by the average metric for the canary instance. More generally, it is broadly contemplated that any number of different techniques could be used to calculate a value that measures the data collected for the canary instance, relative to the corresponding data collected for the cluster of baseline instances.

Additionally, in the depicted example, the canary analysis component 150 has determined that the latency metric 645 for the second canary instance has a relative value of 1.94 (i.e., relative to the latency metric collected for the cluster of baseline instances), and has classified the metric 645 as hot, due to the metric's 645 relative value significantly exceeding a value of 1.0 (e.g., exceeding the value of 1.0 by a threshold amount). Furthermore, the latency metric 655 for the third canary instance has been assigned a classification of truncated. In the depicted embodiment, the truncated classification represents a metric for which one or more error messages were returned from the monitor component, or for which much less data than would be expected was returned. As discussed above, the truncated classification is used in this embodiment to denote a metric for which at least one of the performance monitors associated with the corresponding canary instance encountered an error.

Once the canary analysis component 150 has classified each of the performance metrics for each of the canary instances, the canary analysis component 150 could then calculate an aggregate relative performance value for each of the measured performance metrics. Generally, the aggregate relative performance values reflect the value of the performance metric across all of the monitored canary instances. As shown, the interface 600 includes aggregate relative performance values 685, 680, 660, 665, 670 and 675. Additionally, the canary analysis component 150 could assign classifications to the aggregate relative performance values. For instance, in the depicted embodiment, the aggregate relative performance value 660 has been assigned a classification of nodata.

Once the aggregate relative performance values are calculated, the canary analysis component 150 could calculate the final measure of performance 640 for the version of software running on the canary instances. In the interface 600, the final measure of performance 640 is shown as a value of 0.85 and has been assigned a classification of "80% ok." In this embodiment, the "80% ok" classification represents the likelihood that 0.85 is close enough to 1.0 for the measured data to still be considered acceptable. In other words, in the present example, the canary analysis component 150 has determined that the aggregate of all the metrics for all of the canary instances are approximately 85% of the value of their corresponding counterpart metrics collected for the cluster of baseline instances, and that this is sufficiently close to 1.0 to have confidence that the canary instances are functioning properly. Advantageously, doing so enables a user to quickly see how differently the canary instances are performing, relative to the baseline instances.

In one embodiment, the canary analysis component 150 is configured to exclude performance metric data having a particular classification(s). For instance, the canary analysis component 150 could be configured to exclude performance data classified as truncated data when calculating the aggregate relative performance values. As another example, the canary analysis component 150 could be configured to exclude any aggregate relative performance values having a noisy classification in calculate the final measure of performance for the canary instances. Doing so allows the canary analysis component 150 to selectively exclude particular performance data when calculating the aggregate relative performance values and/or the final measure of performance for a given set of canary instances running a given version of software.

2.0 Progressive Activation, Deactivation, and Control of Access to Canary Instances and Baseline Instances for Software Analysis 2.1 Overview In an embodiment, a data processing method comprises using computing apparatus, causing instantiating, at one or more cloud service providers, a plurality of baseline application instances that are running a first version of software, and one or more canary application instances that are running a second version of the software; using computing apparatus including a load balancer, causing selectively routing a first proportion of incoming requests to the baseline instances, and routing a second proportion of the incoming requests to the canary instances; monitoring the plurality of canary instances to collect performance data for a plurality of performance metrics; determining that the performance data indicates a negative performance issue, and in response thereto: using computing apparatus, automatically updating the first proportion to be larger and updating the second proportion to be smaller, and then reconfiguring the load balancer based upon the first proportion and the second proportion; terminating one or more of the canary application instances.

Other embodiments include, without limitation, a non-transitory computer-readable medium that includes instructions that enable a processing unit to implement one or more aspects of the disclosed methods as well as a system configured to implement one or more aspects of the disclosed methods.

2.2 Example Process

Figure 8:
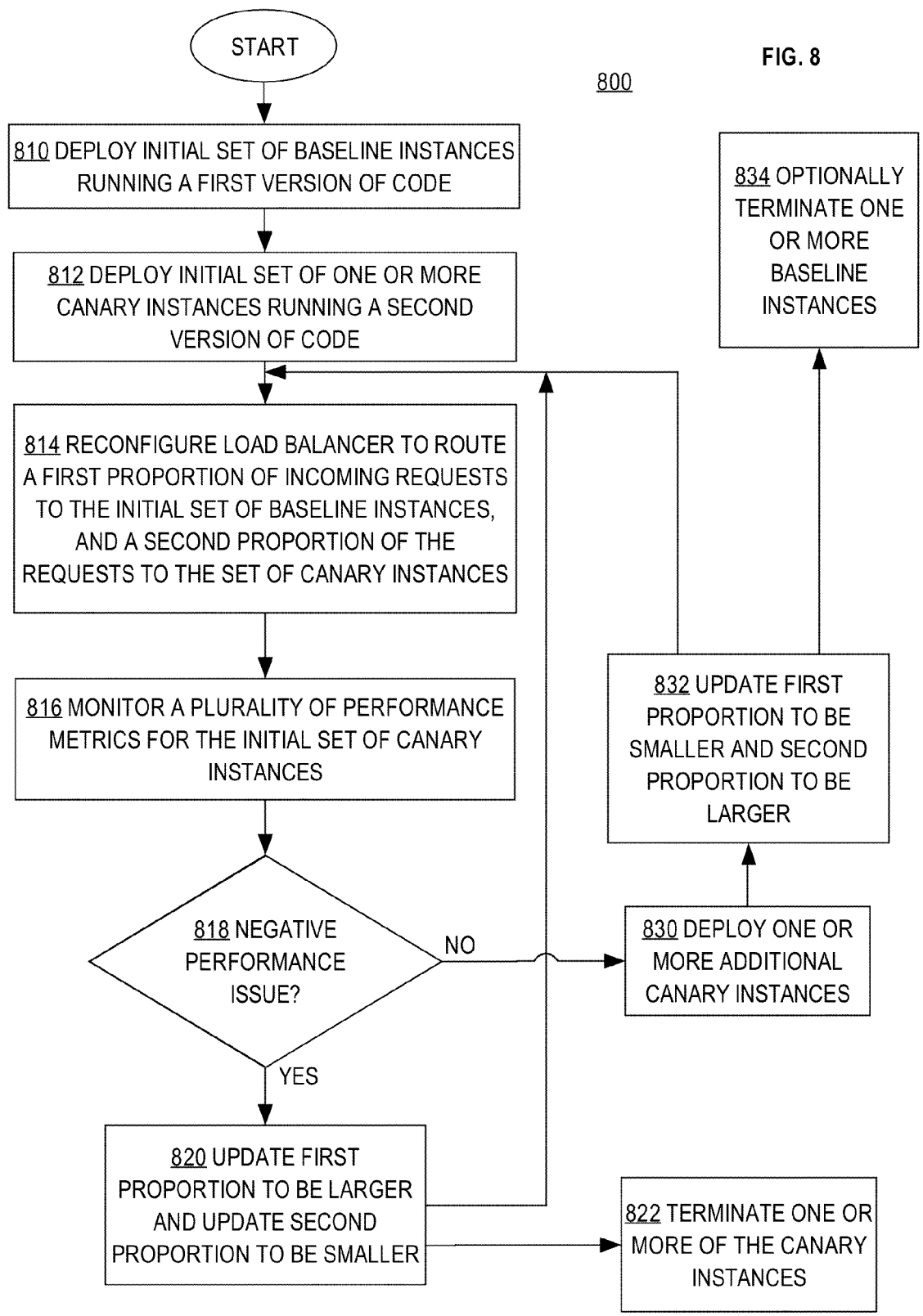
FIG. 8 illustrates an example process for progressively instantiating and/or removing and/or controlling canary instances for software analysis.

FIG. 8 illustrates an example process for progressively instantiating and/or removing and/or controlling canary instances for software analysis. In an embodiment, a method 800 begins at block 810 which involves deploying an initial set of baseline instances running a first version of code. The deployment of block 810 may use the same techniques previously described for block 310 of FIG. 3.

At block 812, an initial set of one or more canary instances, running a second version of code, is deployed. Deployment at block 812 may be performed in a manner similar to that previously described for block 315 of FIG. 3. At block 812, the deployment may comprise a single instance, or a smaller number of instances than deployed at block 810 for the baseline instances running the first version. In other words, in one embodiment, block 812 can involve deploying only a small number of canary instances running the second version of code while maintaining a much larger number of baseline instances running the first version of code.

The number of canary instances may depend upon a confidence level in the reliability of the second version of code, or may be chosen as a conservatively low number simply for purposes of constraining any errors or issues encountered when the second version becomes operational. For example, it is conceivable that a system operator could elect to deploy a single canary instance at block 812, or a few instances, while deploying or maintaining a much larger number of baseline instances at block 810.

Blocks 810, 812 may be performed at considerably different times. For example, deployment at block 810 of the first version may have occurred days, weeks or months earlier than deployment of canary instances at block 812. In a typical operational scenario, block 810 occurs at an arbitrary time in the past and the baseline instances represent a current production version of code, and block 812 is performed at the time that an updated second version of code becomes available. Often the second version of code is associated with new or different features or functions, or bug fixes, or a new architecture, or other changes.

The one or more of the baseline instances deployed at block 810, and one or more of the canary instances deployed at block 812, may be instantiated using the same cloud computing environment 200 (FIG. 2) or using different cloud computing environments, of the same or different cloud service provider (CSP) entities. For example, block 810, block 812 may comprise issuing instructions using the management consoles of a single CSP or multiple CSPs. Further, in an embodiment, applications and instances may be defined in terms of clusters based on metadata definitions that are specified by a particular CSP. For example, a cluster may be an Amazon Web Services (AWS) Autoscale group with associated rules and other metadata.

At block 814, the process reconfigures a load balancer to route a first proportion of requests to the initial set of baseline instances and a second proportion of the requests to the set of canary instances. For example, canary analysis component 150 forms and sends one or more configuration commands to load balancer 110 over a network connection; in some embodiments, the commands may use a management protocol such as SNMP or may involve direct issuance of command-line interface (CLI) commands to the load balancer.

The effect of the reconfiguration is to change the relative proportion of requests from clients 105 that reach the production instances 120 and canary instances 130. The first proportion and second proportion may be considerably different in magnitude. For example, in one approach the first proportion could be 90% and the second proportion could be 10%; proportion splits of 80%-20%, 70%-30%, or any other division of traffic may be used. Typically a difference between the first proportion and the second proportion are large when the number of canary instances is small, and/or when the canary instances have been newly deployed in comparison to the time at which the baseline instances were deployed.

Block 816 comprises monitoring a plurality of performance metrics for the initial set of canary instances. Block 816 may be performed using any of the techniques previously described for monitoring, such as the examples given in connection with block 325 of FIG. 3. Block 816 focuses monitoring on performance just of the canary instances, however, rather than both the baseline instances and the canary instances. In general, the purpose of block 816 is to detect anomalies, errors or negative performance issues in the execution or use of the canary instances that were deployed at block 812.

Next, a test at block 818 determines whether a negative performance issue is indicated in the monitoring at block 816. A negative performance issue may involve a performance metric for a canary instance crossing a threshold value that is associated with negative performance, and/or an aggregate metric for all the canary instances crossing the same threshold value or a different threshold value. Thus, a negative performance issue that causes an affirmative result for block 818 could be a single error at a single one of the canary instances 130, or the method may be configured so that multiple errors, whether similar or different, must be detected from different canary instances 130 before block 818 produces an affirmative result.

Additionally or alternatively, a negative performance issue may involve detecting a trend in a direction that is associated with negative performance, for a single canary instance 130 or a plurality of canary instances 130, for the same metric at each canary instance or a plurality of different metrics at the same canary instance or different canary instances. The specific technique used to identify a negative performance issue is not critical.

Further, an arbitrary amount of time may elapse between the performance of block 814 and/or block 816 and block 818. For example, the test of block 818 may be performed after a few seconds, minutes, hours or any other suitable time period following deployment of the canary instances and the reconfiguration of the load balancer.

If the test of block 818 is affirmative, then in response, the general approach of method 800 is to reduce the number of canary instances and reconfigure the load balancer to send more traffic to the baseline instances. In an embodiment, when the test of block 818 is affirmative, control passes to block 820 at which the first proportion is updated to be larger, and the second proportion is updated to be smaller.

Control then transfers back to block 814, at which the load balancer is reconfigured based on the updated values of the first proportion and the second proportion. As a result, for example, the load balancer 110 is reconfigured to route a different, larger first proportion of incoming requests from client 105 to the initial set of baseline instances, and to route a different, smaller second proportion of incoming requests to the canary instances. In some cases, if only one canary instance was deployed initially, the effect of block 820 may be to route all traffic only to the baseline instances and to route no traffic to any canary instance.

A benefit of this approach is that traffic from clients 105 can be moved nearly immediately off of the second version of code and directed only to the first version of code hosted on the baseline instances, deferring the task of terminating, deregistering or diagnosing the second version of code and the canary instances and/or allowing terminating to occur over a longer time period without subjecting client requests to erroneous processing at the canary instances. In particular, traffic may be routed away from the second version of code without incurring time delays relating to terminating the canary instances; instead, the load balancer 110 may be reconfigured rapidly, and therefore traffic is rapidly redirected back to the baseline instances.

At block 822, optionally one or more of the canary instances may be deactivated. In some embodiments, block 822 may involve sending instructions to cloud storage units or to a cloud service provider to terminate one or more of the canary instances. Block 822 also can involve deregistering one or more of the canary instances without termination, allowing those one or more canary instances to continue to execute or be available for offline testing and diagnostic purposes, without receiving requests from clients 105 because the load balancer 110 has been reconfigured. Block 822 may involve waiting for all the clients 105 to complete using a canary instance to which the clients have active connections, and then terminating the canary instance when the connections have closed.

If the test of block 818 is negative, then performance of the one or more canary instances is acceptable, and the general approach of method 800 is to increase the number of canary instances and reconfigure the load balancer to send more traffic to the canary instances and less traffic to the baseline instances. In one approach, if the test of block 818 is negative, control transfers to block 830 at which one or more additional canary instances are deployed. Referring again to FIG. 1, in an embodiment, block 830 involves instantiating more canary instances 130 so that the value of N associated with instances 130 is larger. Next, in block 832, the first proportion is updated to be smaller, and the second proportion is updated to be larger.

Control then transfers to block 814 at which the load balancer is reconfigured to route requests from clients to the baseline instances and canary instances based on the updated values of the first proportion and the second proportion. At block 834, optionally one or more of the baseline instances may be terminated.

As a result, when the canary instances are performing well as indicated by the monitoring at block 816 and the test of block 818, additional canary instances may be deployed automatically and the load balancer 110 may be reconfigured to route additional requests of clients 105 to those new canary instances and to route fewer requests to the baseline instances. Further, the baseline instances 120 that are no longer needed can be terminated. In an embodiment, after each reconfiguration of the load balancer at block 814, and/or continued monitoring at block 816, may be followed by a configurable period of delay time before the test of block 818 is performed and before responsive action is taken as shown in blocks 82 to 834 inclusive, for the purpose of allowing adequate use, monitoring and evaluation of newly instantiated canary instances before traffic rerouting occurs.

In this manner, embodiments provide for automatic, progressive instantiation of larger numbers of canary instances 130 and automatic, progressive termination of baseline instances so that the total number of production instances 120 becomes progressively smaller. By configuring the delay time value, the rate of progressive change may be made faster or slower. No particular minimum delay time is required and the delay time may be zero to accomplish a rapid transition from the first code version executing at the production instances 120 to the second code version of the canary instances 130. Similarly, the use of a short or zero delay time value would enable the process to rapidly respond to errors or anomalies in performance of the canary instances that are detected at block 818.

2.3 Example Web Application with Console

In one embodiment, the process of FIG. 8 may be implemented in the form of a web application that provides the functions of FIG. 8 and other functions. Asgard, a web application written in Grails by Netflix, Inc., Los Gatos, Calif., is an example implementation. In an embodiment, an application operator may define an application in terms of an operating system-application image, such as an Amazon Machine Image (AMI) when the CSP is AWS, and related metadata. Example metadata includes a name, type, description, owner, email address of owner, monitor bucket type, create time, and update time. The application is then associated with one or more clusters, Auto Scaling Group (ASG) data, load balancers, security groups, and launch configurations. Thereafter, launching an instance and maintaining instances is performed using functions of the web application that call AWS primitives. The web application may implement a console that may also represent other constructs of the CSP such as databases and other services, and may implement calls to CSP primitives to execute operations with such constructs and services.

Figure 9:
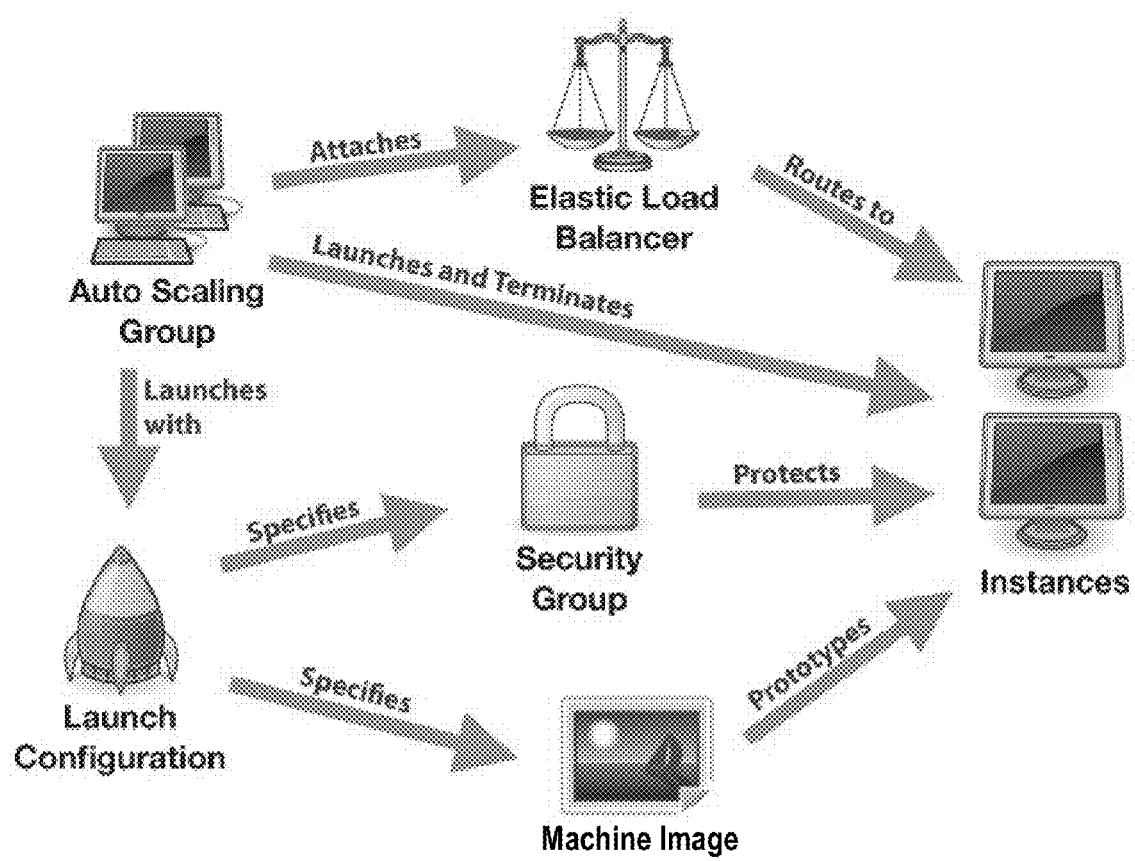
FIG. 9 illustrates relationships between functional units in a cloud service environment that may be used to implement embodiments.

FIG. 9 illustrates relationships between functional units in a cloud service environment that may be used to implement embodiments. As illustrated in FIG. 9, in an embodiment, an Auto Scaling Group (ASG) can attach zero or more Elastic Load Balancers (ELBs) to new instances. In this context, an ASG is an example of a cluster applicable in the Amazon.com public cloud service environment; in other environments, clusters may be represented using other data abstractions. An ELB can send user traffic to application instances. An ASG can launch and terminate instances. For each instance launch, an ASG uses a Launch Configuration. The Launch Configuration specifies which Machine Image, including but not limited to an Amazon Machine Image (AMI), and which Security Groups to use when launching an instance. The MI contains all the bits that will be on each instance, including the operating system, common infrastructure such as Apache and Tomcat, and a specific version of a specific Application. Security Groups can restrict the traffic sources and ports to the instances.

In an embodiment, large numbers of the cloud objects of FIG. 9 may be defined in an application registry in a data repository, such as SimpleDB, using naming conventions to associate multiple cloud objects with a single application. Each application may have an owner and an email address to establish who is responsible for the existence and state of the cloud objects that are associated with an application.

Figure 10:
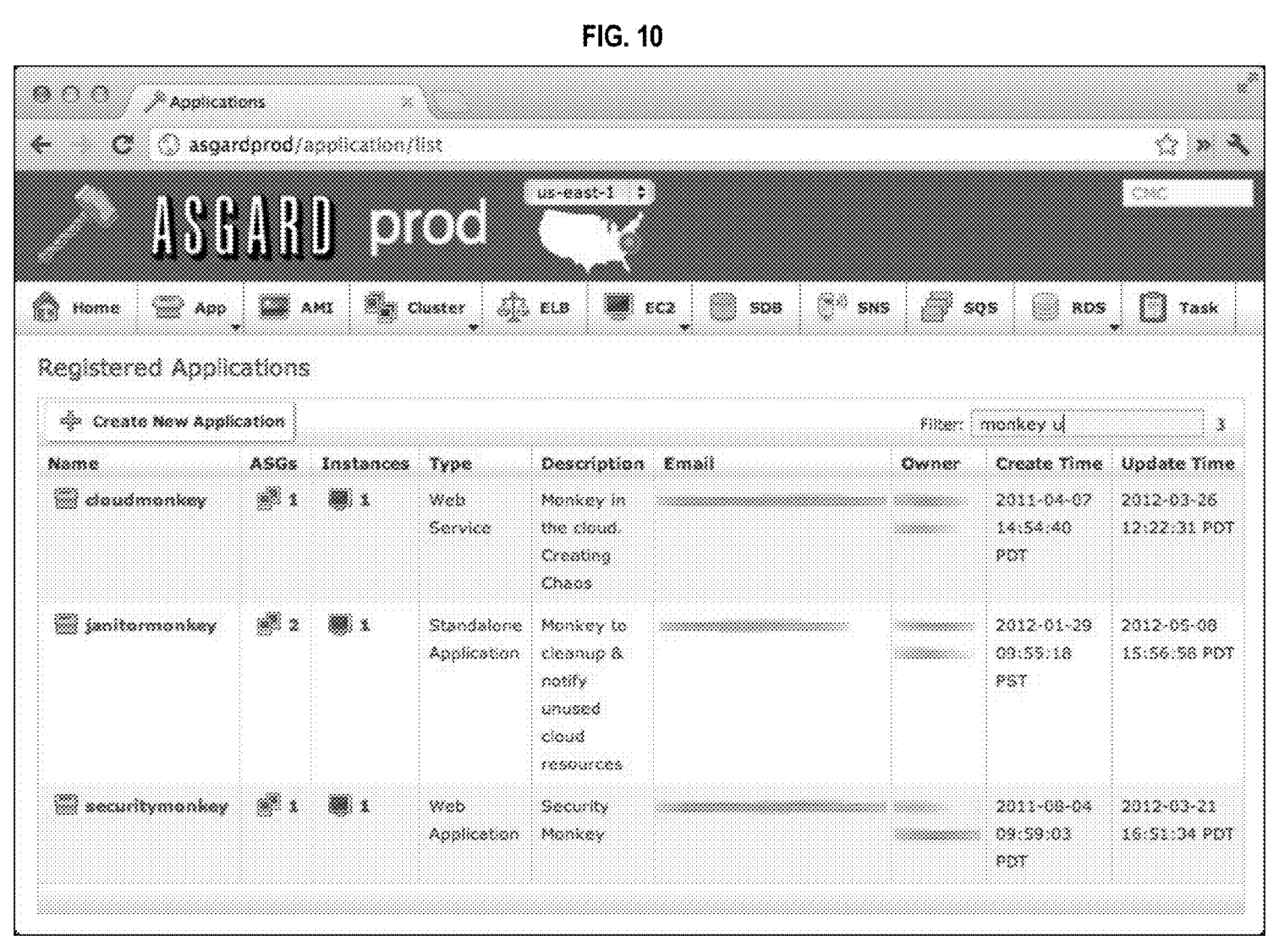

FIG. 10 illustrates an example screen display that may be generated by an application framework and showing a filtered subset of applications running in a production account at a CSP and associated with a particular geographic region.

Figure 11:
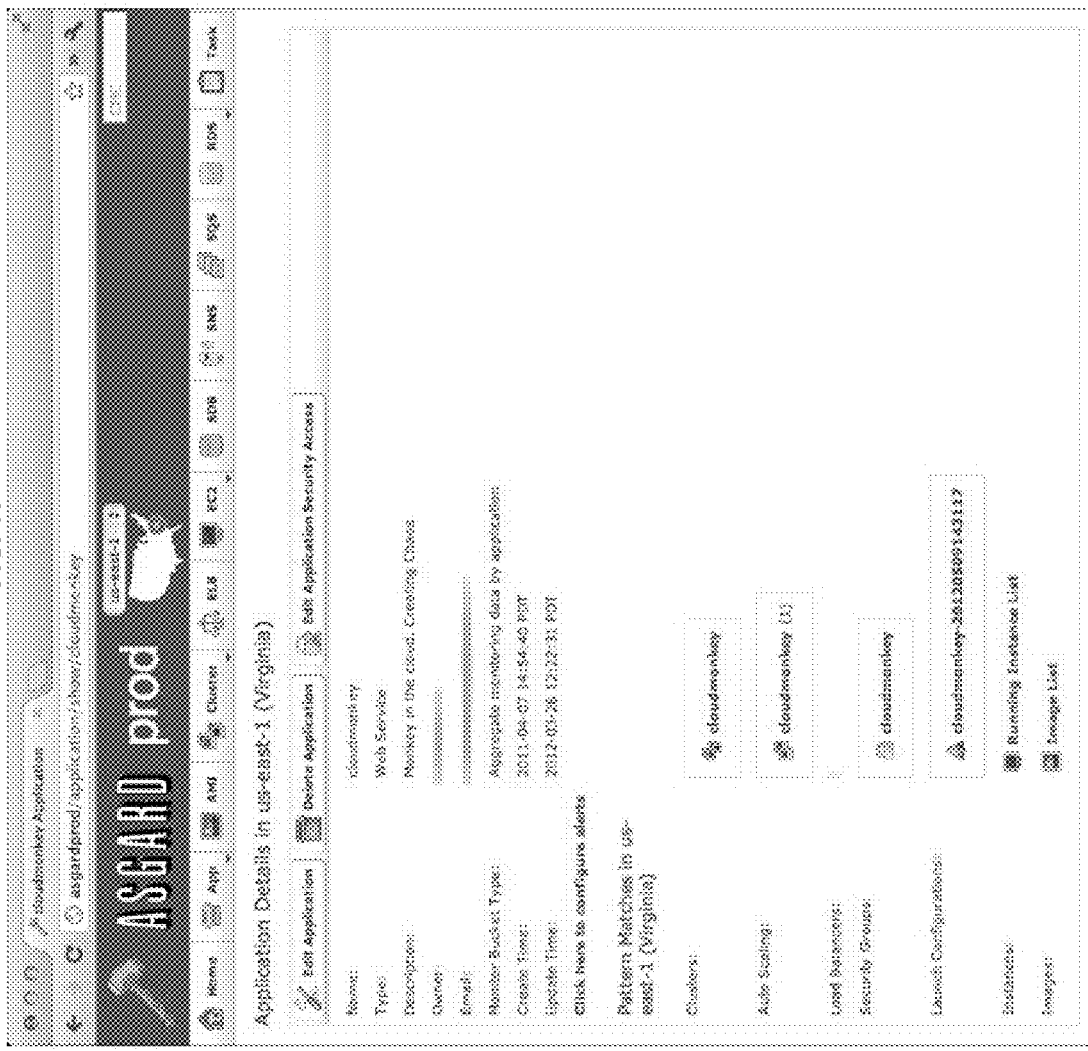
FIG. 11 illustrates an example screen display that may be generated by an application framework and showing metadata details for an example application with links to related cloud objects of the type shown in FIG. 9.

FIG. 11 illustrates an example screen display that may be generated by an application framework and showing metadata details for an example application with links to related cloud objects of the type shown in FIG. 9.

Figure 12:
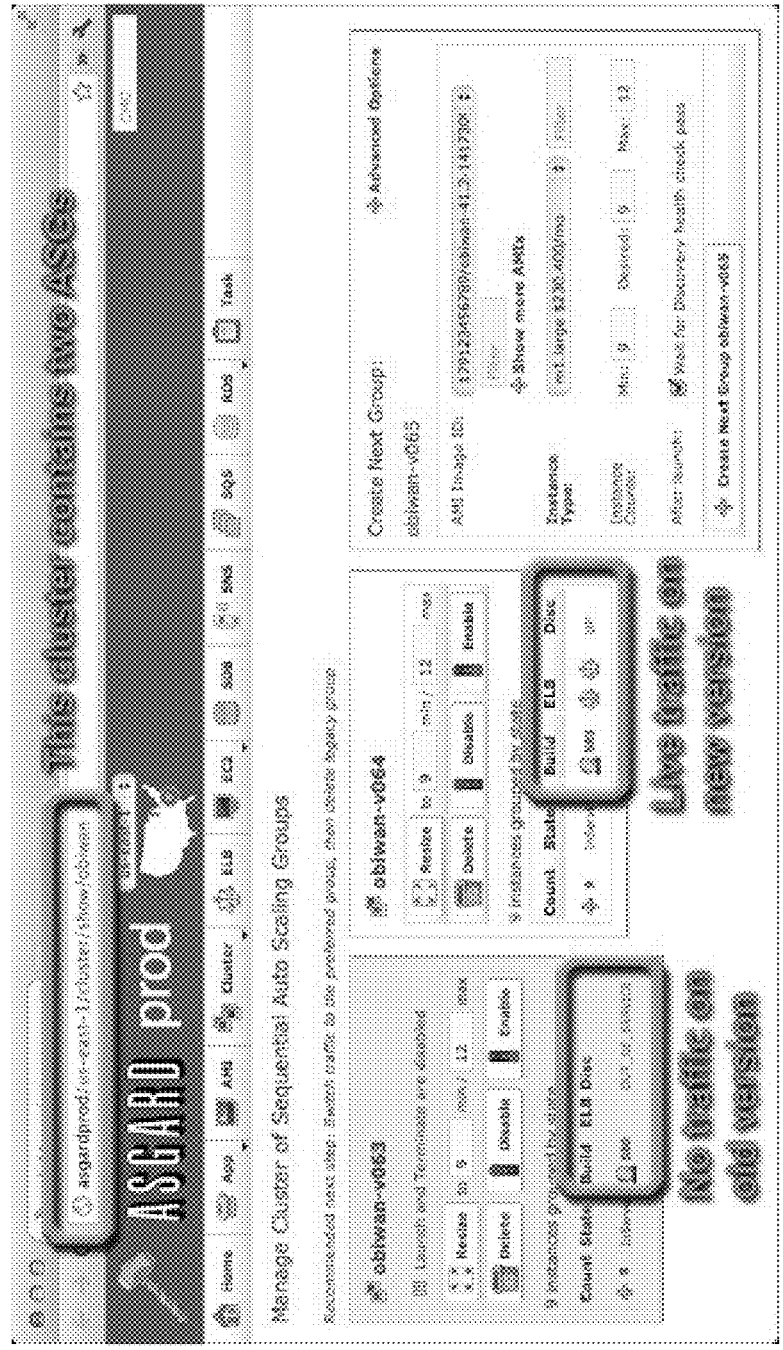
FIG. 12 illustrates an example screen display that may be generated by an application framework and showing a cluster in mid-deployment.

While certain embodiments are described herein in the context of ASGs for use in the Amazon CSP environment, the broad techniques disclosed herein may be used in connection with clusters or cluster data abstractions of other environments and are not limited to use with ASGs. In an embodiment, an application cluster may be defined to contain one or more ASGs. The ASGs are associated by naming convention. When a new ASG is created within a cluster, an incremented version number is appended to the cluster's "base name" to form the name of the new ASG. For example, a cluster named "alpha" could contain two ASGs denoted "alpha-v001" and "alpha-v002". FIG. 12 illustrates an example screen display that may be generated by an application framework and showing a cluster in mid-deployment. In the example of FIG. 12, the old ASG is disabled, meaning that it is not accepting traffic but remains available in case a problem occurs with the new ASG.

Figure 13:
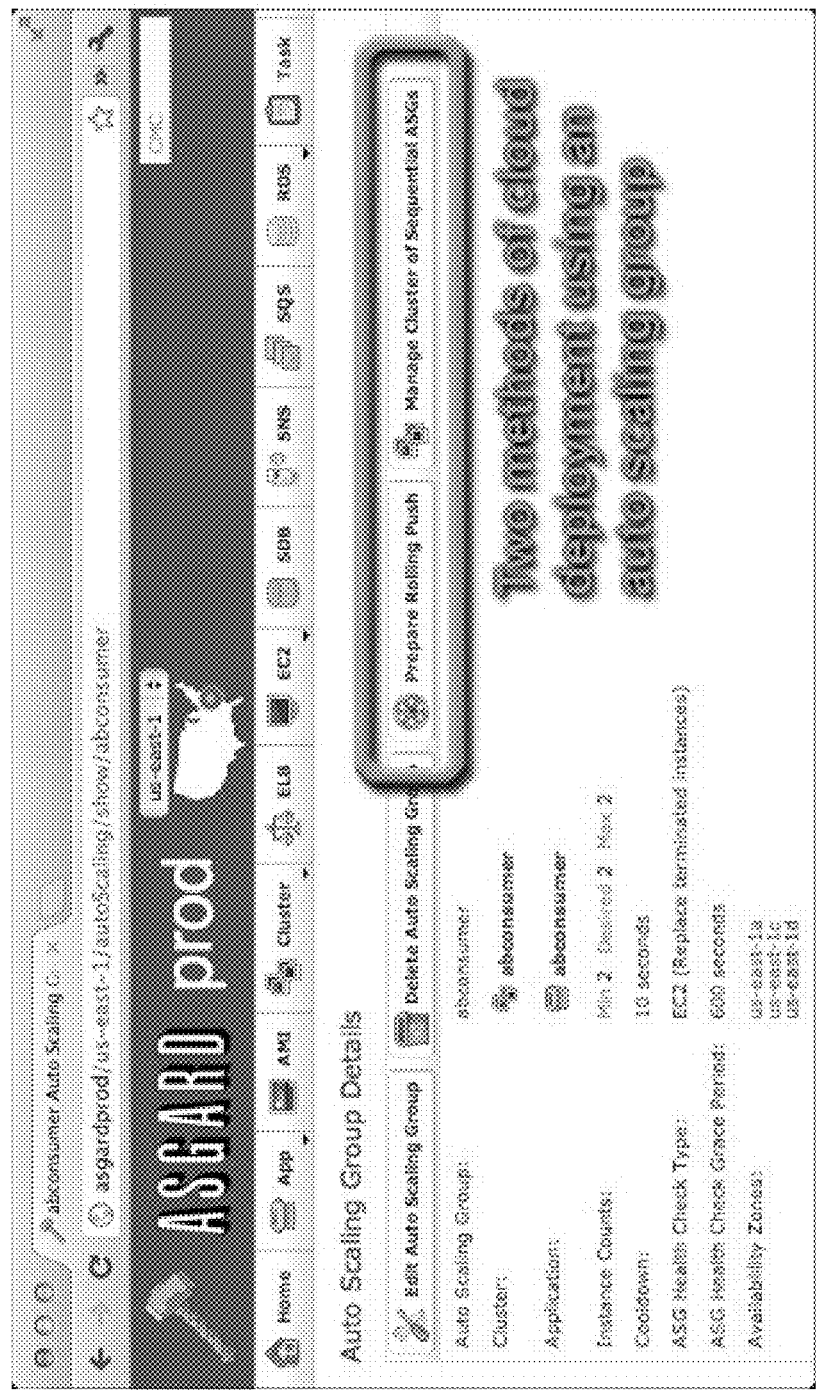
FIG. 13 illustrates an example screen display that may be generated by an application framework and showing auto scaling group details with user interface buttons that may access two methods of instance deployment using an auto scaling group.

FIG. 13 illustrates an example screen display that may be generated by an application framework and showing auto scaling group details with user interface buttons that may access two methods of instance deployment using an auto scaling group. In an embodiment, the functions of FIG. 13 may be used to deploy a new version of an application in a way that can be reversed at the first sign of trouble, to greatly reduce the duration of service outages that are caused by bad deployments. In an embodiment, selecting Manage Cluster of Sequential ASGs causes the application framework to invoke code that implements the process previously described for FIG. 8. In the example of FIG. 12, performing the process of FIG. 8 could generally result in performing:

1. Create the new ASG obiwan-v064
2. Enable traffic to obiwan-v064
3. Disable traffic on obiwan-v063
4. Monitor results and notice that things are going badly
5. Re-enable traffic on obiwan-v063
6. Disable traffic on obiwan-v064
7. Analyze logs on bad servers to diagnose problems
8. Delete obiwan-v064

Additionally or alternatively, referring again to FIG. 13, in an embodiment, selecting the Prepare Rolling Push function may be used to invoke an alternative deployment system called a rolling push. In an embodiment, only one ASG is needed, and old instances are gracefully deleted and replaced by new instances one or two at a time until all the instances in the ASG have been replaced.

In an embodiment, a rolling push comprises the following operations.

1. For each of the baseline instances, a corresponding canary instance is instantiated, so that there are equal numbers of baseline instances and canary instances.
2. The load balancer 110 is reconfigured to route a proportion of requests from clients 105 to a first one of the canary instances.
3. Concurrently, the number of client connections to each of the baseline instances is monitored. As connections are closed and a particular baseline instance becomes idle, the proportion value is increased, thereby routing more traffic to the canary instances, and the idle particular baseline instance is terminated. The particular order of these operations may vary depending on the time required to instantiate and terminate instances.
4. The process repeats automatically until all the baseline instances have become idle and have been terminated, and until the proportion value has been modified to route traffic to all of the canary instances.

Rolling pushes are useful in two main cases: If an ASG's instances are sharded so each instance has a distinct purpose that should not be duplicated by another instance; if the clustering mechanisms of the application (such as Cassandra) cannot support sudden increases in instance count for the cluster.

These approaches offer numerous benefits over using the management console that is natively provided by the CSP. For example, security credentials such as secret keys can be hidden from the users of the application framework, whereas using the CSP's management console typically requires the user to know or possess the secret keys to access a CSP account. Further, embodiments introduce the concept of clusters or Auto Scaling Groups (ASGs) as a basic unit of deployment and management for application instances. The framework also can enforce naming conventions, reducing complexity and enabling sensible associations of related cloud objects. The application framework can provide independent logging of user actions so that the introduction of errors can be traced back to specific user actions for auditing. The application framework can provide integration points to other systems or services. The application framework can implement automated workflows at an abstraction layer above the CSP console, by implementing new processes that are executed using calls to various CSP services, as described herein in connection with FIG. 8.

While certain embodiments have been described in terms of changing control from a first version of an application in production to a second version of the application that is a canary version or newer version, other embodiments may be used to quickly rollback traffic to an old cluster. In one embodiment, a rollback process comprises:

1) Deploy a new (second) version of the software in another cluster.

2) Shift traffic to the new version using a load balancer, eventually having all traffic going to new version.

3) Keep old version running for some period of time. If the new version exhibits any problems, quickly shift traffic back to the old cluster using a load balancer. This would shorten recovery time as it eliminates the need to deploy the old version of the software when the new one exhibits problems.

3.0 Implementation Example—Hardware Overview

Figure 7:
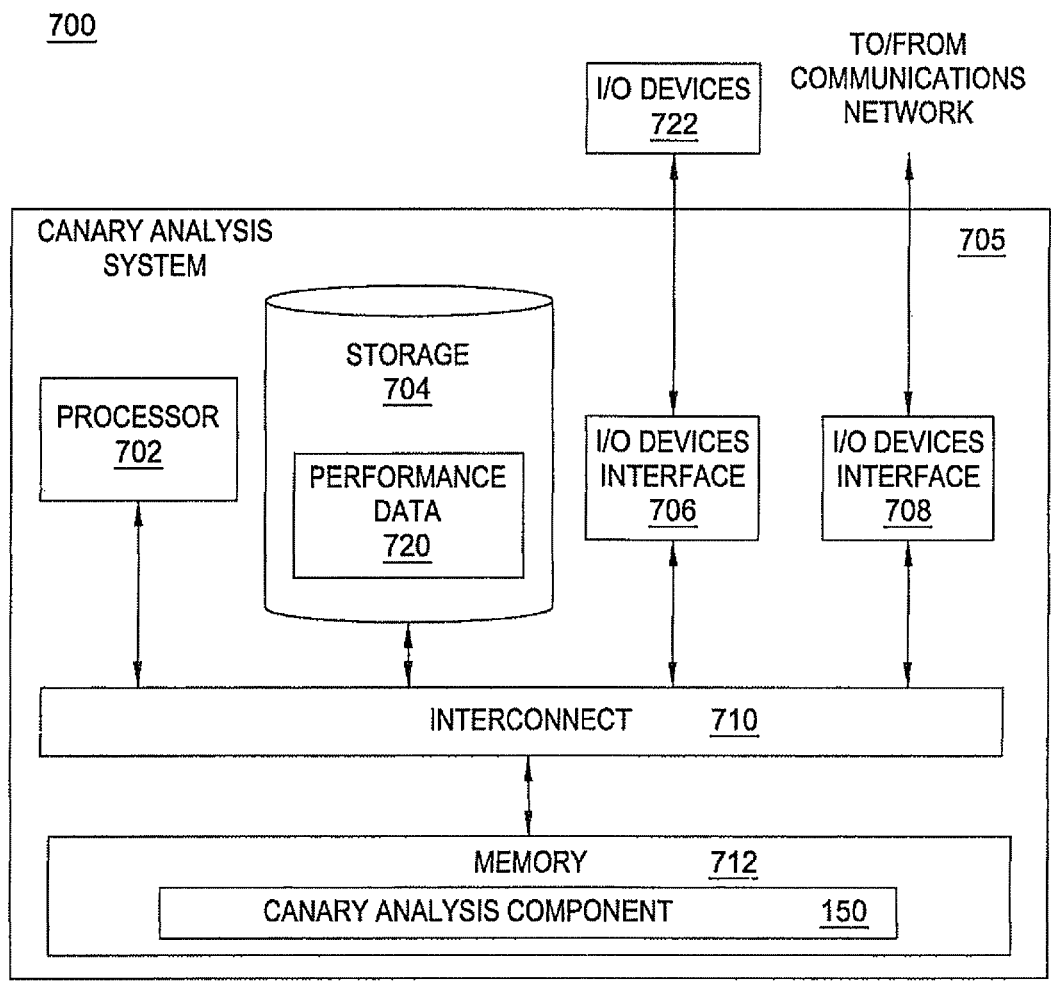
FIG. 7 illustrates a computing system configured with a canary analysis component, according to one embodiment described herein.

FIG. 7 illustrates a computing system configured with a canary analysis component, according to one embodiment described herein. As shown, the environment 700 includes a canary analysis system 705 which includes, without limitation, a central processing unit (CPU) 702, a network interface 708, an interconnect 710, and a system memory 712. The CPU 702 retrieves and executes programming instructions stored in the system memory 712. Similarly, the CPU 702 stores and retrieves application data residing in the system memory 712. The interconnect 710 facilitates transmission, such as of programming instructions and application data, between the CPU 702, input/output (I/O) devices interface 706, storage 704, network interface 708, and system memory 712. The I/O devices interface 706 is configured to receive input data from user I/O devices 722. Examples of user I/O devices 722 may include one of more buttons, a keyboard, and a mouse or other pointing device. The I/O device interface 706 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 702 is included to be representative of a single CPU, multiple CPUs, a single CPU having multiple processing cores, and the like. And the system memory 712 is generally included to be representative of a random access memory. The storage 704 may be a disk drive storage device. Although shown as a single unit, the storage 704 may be a combination of fixed and/or removable storage devices, such as fixed disc drives, floppy disc drives, tape drives, removable memory cards, or optical storage, network attached storage (NAS), or a storage area-network (SAN). The network interface 708 is configured to transmit data via the communications network, e.g., to transmit context tokens and localized digital assets from client devices as well as to return an assembled variation of digital content generated by the dynamic context-based assembler to the client devices.

The system memory 712 stores a canary analysis component 150 that is configured to evaluate a second version of software. As discussed above, the canary analysis component 150 or a load balancing component (not shown) could selectively route incoming requests to a plurality of baseline instances and a plurality of canary instances, where the baseline instances run a first software version and the canary instances run the second software version. The canary analysis component 150 could monitor the software instances to collect performance data for a plurality of performance metrics. Additionally, the canary analysis component 150 could calculate aggregate baseline performance metrics, where each of the aggregate baseline performance metrics is calculated based on collected performance data for the plurality of baseline instances. For each of the performance metrics and canary instances, the canary analysis component 150 could calculate a relative performance value that measures the collected performance data for the respective canary instance and for the respective performance metric, relative to the corresponding aggregate baseline performance metric. The canary analysis component 150 could then calculate a final measure of performance for the second version of software, based on the relative performance values.

Additionally, the embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a plurality of baseline instances and canary instances could be deployed within a cloud, and incoming requests could be routed to the baseline and canary instances (e.g., according to a load balancing algorithm). A canary analysis component 150 within the cloud computing environment could monitor the baseline and canary instances and could collect performance data for a number of different performance metrics. The canary analysis component 150 could then calculate an aggregate performance metric for the canary instances, which measures the performance of the canary instances relative to the baseline instances across the plurality of metrics. Doing so allows a user to efficiently analyze the performance for the canary instances from any computing system attached to a network connected to the cloud (e.g., the Internet).

In the preceding, reference is made to embodiments of the invention. However, it should be understood that the present disclosure is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
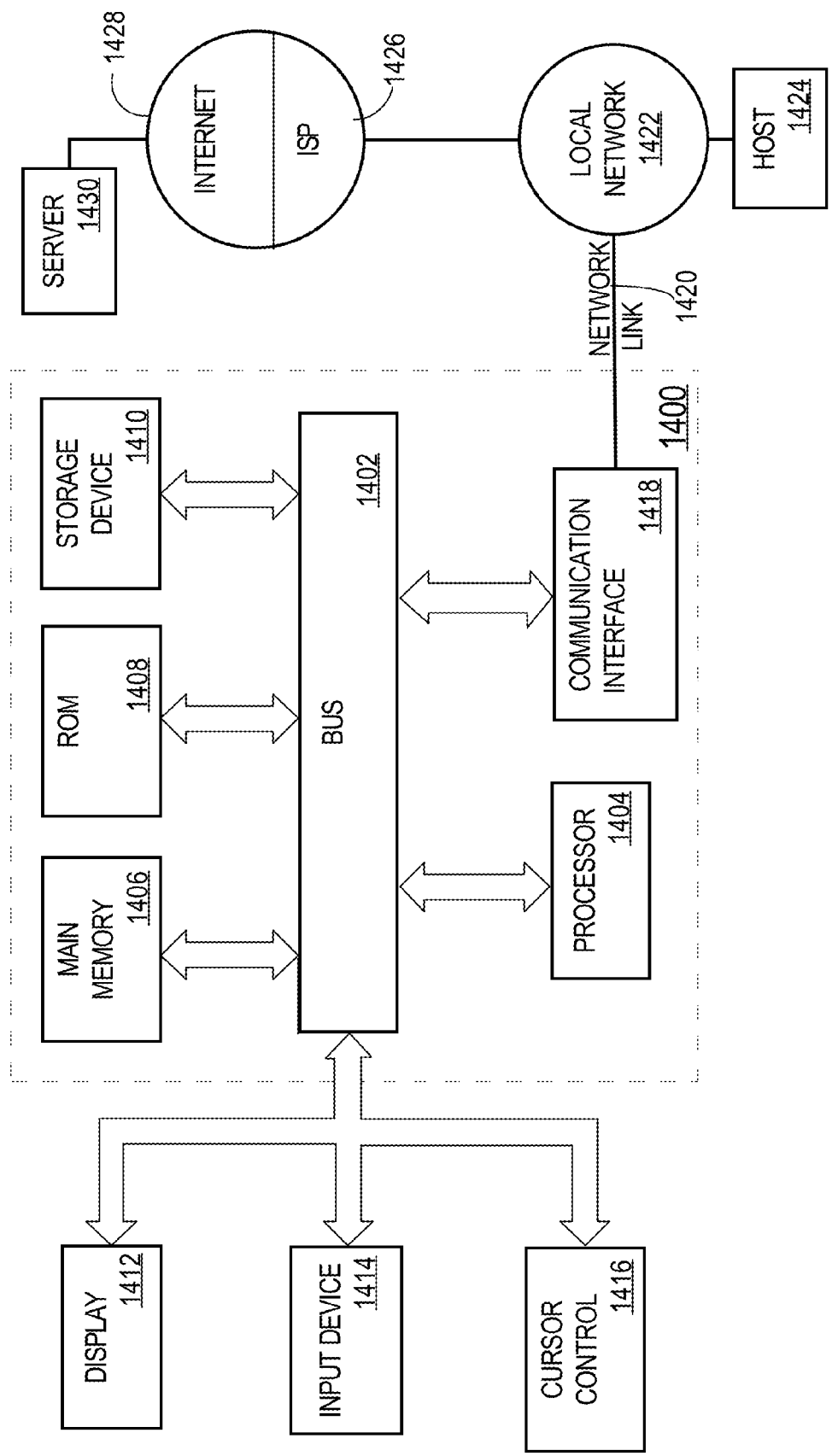
FIG. 14 illustrates an example computer system with which an embodiment may be used.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Therefore, the scope of the present invention is determined by the claims that follow.

We claim:

1. A data processing method, comprising:
   using computing apparatus, causing instantiating, a plurality of baseline application instances that are running a first version of software, and one or more canary application instances that are running a second version of the software;
   using computing apparatus including a load balancer, causing selectively routing a first proportion of incoming requests to the baseline instances, and routing a second proportion of the incoming requests to the canary instances;
   monitoring the plurality of canary instances to collect performance data for a plurality of performance metrics;
   determining that the performance data indicates a negative performance issue, and in response thereto:
   using computing apparatus, automatically updating the first proportion to be larger and updating the second proportion to be smaller, and then reconfiguring the load balancer based upon the first proportion and the second proportion.

2. The method of claim 1, further comprising:
   determining that the performance data does not indicate a negative performance issue, and in response thereto:
   using computing apparatus, automatically updating the first proportion to be smaller and updating the second proportion to be larger, and then reconfiguring the load balancer based upon the first proportion and the second proportion.

3. The method of claim 2, further comprising terminating one or more of the baseline application instances.

4. The method of claim 1, wherein the determining that the performance data indicates a negative performance issue includes using computing apparatus to evaluate at least one of (i) a threshold amount of variance, (ii) one or more error messages relating to the collected performance data and (iii) a lack of performance data.

5. The method of claim 1, comprising causing instantiating the plurality of baseline application instances in a first cluster and causing instantiating the one or more canary application instances in a second cluster.

6. The method of claim 5, wherein the first cluster and second cluster are defined by metadata that is created and managed using a web application console that is independent of a particular cloud service provider at which the plurality of baseline application instances and the one or more canary application instances have been instantiated.

7. The method of claim 1, comprising causing instantiating the plurality of baseline application instances in a first cluster and causing instantiating the one or more canary application instances in a second cluster, and comprising instantiating the plurality of baseline application instances using a first cloud service provider and causing instantiating the one or more canary application instances using a second cloud service provider that is different from the first cloud service provider.

8. The method of claim 1,
   using computing apparatus, a plurality of canary application instances corresponding in number to the baseline application instances;
   using computing apparatus including a load balancer, causing selectively routing a first proportion of incoming requests to the baseline instances, and routing a second proportion of the incoming requests to the canary application instances;
   using computing apparatus, automatically progressively updating the first proportion to be smaller and updating the second proportion to be larger, reconfiguring the load balancer based upon the first proportion and the second proportion, and progressively terminating the baseline application instances until all the requests are directed only to the canary application instances.

9. The method of claim 1, further comprising terminating one or more of the canary application instances.

10. A non-transitory computer-readable medium storing one or more sequences of instructions which when executed cause performing:
    using computing apparatus, causing instantiating, at one or more cloud service providers, a plurality of baseline application instances that are running a first version of software, and one or more canary application instances that are running a second version of the software;
    using computing apparatus including a load balancer, causing selectively routing a first proportion of incoming requests to the baseline instances, and routing a second proportion of the incoming requests to the canary instances;

monitoring the plurality of canary instances to collect performance data for a plurality of performance metrics;

determining that the performance data indicates a negative performance issue, and in response thereto:

using computing apparatus, automatically updating the first proportion to be larger and updating the second proportion to be smaller, and then reconfiguring the load balancer based upon the first proportion and the second proportion.

11. The non-transitory computer-readable medium of claim 10, further comprising sequences of instructions which when executed cause:

determining that the performance data does not indicate a negative performance issue, and in response thereto:

using computing apparatus, automatically updating the first proportion to be smaller and updating the second proportion to be larger, and then reconfiguring the load balancer based upon the first proportion and the second proportion.

12. The non-transitory computer-readable medium of claim 11, further comprising sequences of instructions which when executed cause terminating one or more of the baseline application instances.

13. The non-transitory computer-readable medium of claim 10, wherein the sequences of instructions which when executed cause determining comprise sequences of instructions which when executed cause determining that the performance data indicates a negative performance issue using computing apparatus to evaluate at least one of (i) a threshold amount of variance, (ii) one or more error messages relating to the collected performance data and (iii) a lack of performance data.

14. The non-transitory computer-readable medium of claim 10, comprising sequences of instructions which when executed cause instantiating the plurality of baseline application instances in a first cluster and causing instantiating the one or more canary application instances in a second cluster.

15. The non-transitory computer-readable medium of claim 14, wherein the first cluster and second cluster are defined by metadata that is created and managed using a web application console that is independent of a particular cloud service provider at which the plurality of baseline application instances and the one or more canary application instances have been instantiated.

16. The non-transitory computer-readable medium of claim 10, comprising sequences of instructions which when executed cause instantiating the plurality of baseline application instances in a first cluster and causing instantiating the one or more canary application instances in a second cluster, and comprising instantiating the plurality of baseline application instances using a first cloud service provider and causing instantiating the one or more canary application instances using a second cloud service provider that is different from the first cloud service provider.

17. The non-transitory computer-readable medium of claim 10, further comprising sequences of instructions which when executed cause:

using computing apparatus, a plurality of canary application instances corresponding in number to the baseline application instances;

using computing apparatus including a load balancer, causing selectively routing a first proportion of incoming requests to the baseline instances, and routing a second proportion of the incoming requests to the canary application instances;

using computing apparatus, automatically progressively updating the first proportion to be smaller and updating the second proportion to be larger, reconfiguring the load balancer based upon the first proportion and the second proportion, and progressively terminating the baseline application instances until all the requests are directed only to the canary application instances.

18. A data processing system comprising:

one or more processors;

a canary analysis component that is communicatively coupled to the one or more processors and to at least one cloud computing environment, the cloud computing environment comprising a load balancer, the canary analysis component comprising a non-transitory computer-readable medium storing one or more sequences of instructions which when executed cause performing:

using computing apparatus, causing instantiating, at one or more cloud service providers, a plurality of baseline application instances that are running a first version of software, and one or more canary application instances that are running a second version of the software;

using computing apparatus including the load balancer, causing selectively routing a first proportion of incoming requests to the baseline instances, and routing a second proportion of the incoming requests to the canary instances;

monitoring the plurality of canary instances to collect performance data for a plurality of performance metrics;

determining that the performance data indicates a negative performance issue, and in response thereto:

using computing apparatus, automatically updating the first proportion to be larger and updating the second proportion to be smaller, and then reconfiguring the load balancer based upon the first proportion and the second proportion;

terminating one or more of the canary application instances.

19. The data processing system of claim 18, the canary analysis component further comprising sequences of instructions which when executed cause:

determining that the performance data does not indicate a negative performance issue, and in response thereto:

using computing apparatus, automatically updating the first proportion to be smaller and updating the second proportion to be larger, and then reconfiguring the load balancer based upon the first proportion and the second proportion.

20. The data processing system of claim 19, the canary analysis component further comprising sequences of instructions which when executed cause terminating one or more of the baseline application instances.

21. The data processing system of claim 18, the canary analysis component further comprising sequences of instructions which when executed cause determining that the performance data indicates a negative performance issue includes using computing apparatus to evaluate at least one of (i) a threshold amount of variance, (ii) one or more error messages relating to the collected performance data and (iii) a lack of performance data.

22. The data processing system of claim 18, the canary analysis component further comprising sequences of instructions which when executed cause instantiating the plurality of baseline application instances in a first cluster and causing instantiating the one or more canary application instances in a second cluster.

23. The data processing system of claim 22, wherein the first cluster and second cluster are defined by metadata that is created and managed using a web application console that is independent of a particular cloud service provider at which the plurality of baseline application instances and the one or more canary application instances have been instantiated.

24. The data processing system of claim 18, the canary analysis component further comprising sequences of instructions which when executed cause instantiating the plurality of baseline application instances in a first cluster and causing instantiating the one or more canary application instances in a second cluster, and comprising instantiating the plurality of baseline application instances using a first cloud service provider and causing instantiating the one or more canary application instances using a second cloud service provider that is different from the first cloud service provider.

25. The data processing system of claim 18, the canary analysis component further comprising sequences of instructions which when executed cause:
 using computing apparatus, a plurality of canary application instances corresponding in number to the baseline application instances;
 using computing apparatus including a load balancer, causing selectively routing a first proportion of incoming requests to the baseline instances, and routing a second proportion of the incoming requests to the canary application instances;
 using computing apparatus, automatically progressively updating the first proportion to be smaller and updating the second proportion to be larger, reconfiguring the load balancer based upon the first proportion and the second proportion, and progressively terminating the baseline application instances until all the requests are directed only to the canary application instances.

\* \* \* \* \*